US012297880B2

(12) United States Patent
Yamaguchi et al.

(10) Patent No.: US 12,297,880 B2
(45) Date of Patent: May 13, 2025

(54) MOTOR GEAR UNIT FOR DISC BRAKE APPARATUS AND DISC BRAKE APPARATUS

(71) Applicant: AKEBONO BRAKE INDUSTRY CO., LTD., Tokyo (JP)

(72) Inventors: Yuta Yamaguchi, Tokyo (JP); Shinichi Yamadera, Tokyo (JP); Michio Suzuki, Tokyo (JP); Masataka Kobayashi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 371 days.

(21) Appl. No.: 17/874,523

(22) Filed: Jul. 27, 2022

(65) Prior Publication Data

US 2023/0036745 A1 Feb. 2, 2023

(30) Foreign Application Priority Data

Jul. 29, 2021 (JP) .................. 2021-124214

(51) Int. Cl.
*B60T 13/74* (2006.01)
*F16D 65/18* (2006.01)
(Continued)

(52) U.S. Cl.
CPC .......... *F16D 65/183* (2013.01); *F16D 55/226* (2013.01); *F16D 2121/24* (2013.01);
(Continued)

(58) Field of Classification Search
CPC .. F16D 65/183; F16D 55/226; F16D 2121/24; F16D 2125/50; F16D 2125/48; F16D 2125/52

See application file for complete search history.

(56) References Cited

U.S. PATENT DOCUMENTS 4,804,073 A 2/1989 Taig et al.
10,626,938 B2 * 4/2020 Kumbhar ................ B60T 13/74
(Continued)

FOREIGN PATENT DOCUMENTS

JP H03-500918 T 2/1991
JP 2017-124706 A 7/2017
JP 2018-184093 A 11/2018

OTHER PUBLICATIONS

Japanese Office Action issued Jan. 7, 2025 in Application No. 2021-124214.

*Primary Examiner* — Nicholas J Lane
(74) *Attorney, Agent, or Firm* — Faegre Drinker Biddle & Reath LLP

(57) ABSTRACT

A motor gear unit for a disc brake apparatus includes an electric motor, a speed reduction mechanism configured to transmit rotation of the electric motor to a plurality of rotary-to-linear motion conversion mechanisms arranged in a plurality of cylinders provided in a caliper, and a housing accommodating the electric motor and the speed reduction mechanism. The speed reduction mechanism includes a plurality of final gears connected directly or via another member to the plurality of rotary-to-linear motion conversion mechanisms and a power distribution mechanism that includes one support shaft and that is configured to distribute and transmit input power to the plurality of final gears. The power distribution mechanism is supported by the housing by supporting and fixing end portions of the support shaft on axially both sides to the housing.

13 Claims, 27 Drawing Sheets

(51) Int. Cl.
    *F16D 55/226*    (2006.01)
    *F16D 121/24*    (2012.01)
    *F16D 125/40*    (2012.01)
    *F16D 125/48*    (2012.01)
    *F16D 125/52*    (2012.01)

(52) U.S. Cl.
    CPC ...... *F16D 2125/40* (2013.01); *F16D 2125/48* (2013.01); *F16D 2125/52* (2013.01)

(56) References Cited

U.S. PATENT DOCUMENTS

| | | | |
|---|---|---|---|
| 2016/0290424 A1* | 10/2016 | Gutelius | F16D 65/183 |
| 2019/0063527 A1* | 2/2019 | Thomas | F16D 65/14 |
| 2019/0219117 A1* | 7/2019 | Choi | F16D 65/183 |
| 2020/0309214 A1* | 10/2020 | Al-Mahshi | F16D 65/183 |
| 2021/0018054 A1* | 1/2021 | Jo | F16D 55/226 |
| 2022/0065315 A1* | 3/2022 | Choi | F16H 37/065 |
| 2022/0388490 A1* | 12/2022 | Suzuki | F16D 55/226 |

\* cited by examiner

MOTOR GEAR UNIT FOR DISC BRAKE APPARATUS AND DISC BRAKE APPARATUS

CROSS-REFERENCE TO RELATED APPLICATIONS

The disclosure of Japanese Patent Application No. 2021-124214 filed on Jul. 29, 2021, including specification, drawings and claims is incorporated herein by reference in its entirety.

BACKGROUND

The present invention relates to a motor gear unit for a disc brake apparatus and a disc brake apparatus.

Since a disc brake apparatus is excellent in heat dissipation and can finely adjust a braking force during traveling, the number of cases in which the disc brake apparatus is adopted not only for front wheels of an automobile but also for rear wheels of the automobile is increased.

The disc brake apparatus can be roughly divided into a hydraulic disc brake apparatus that uses operational oil to obtain a braking force and an electric disc brake apparatus that uses an actuator that can be electrically driven to obtain a braking force.

As an electric disc brake apparatus, as disclosed in JP-A-2018-184093 and the like, an electric parking brake type structure in which a braking force by a service brake is generated by feeding brake oil (fluid) into a cylinder, and a braking force by a parking brake is generated by driving an electric actuator such as a rotary-to-linear motion conversion mechanism by an electric motor is known.

In an electric parking type disc brake apparatus mounted on a relatively large vehicle such as a truck or a commercial vehicle, a pad is simultaneously pressed by a plurality of pistons in order to obtain a large braking force.

FIGS. 26 and 27 show an electric parking type disc brake apparatus 100 disclosed in US Patent Application Publication No. 2020/309214 specification.

The disc brake apparatus 100 is a floating type disc brake apparatus, and includes a support 101 fixed to a suspension device, and a caliper 102 supported so as to be movable in an axial direction with respect to the support 101.

An outer pad 103a and an inner pad 103b are supported by the support 101 so as to be movable in the axial direction.

The caliper 102 includes a first cylinder 104a and a second cylinder 104b. A first piston 105a is fitted into the first cylinder 104a, and a second piston 105b is fitted into the second cylinder 104b.

Inside each of the first piston 105a and the second piston 105b, a first rotary-to-linear motion conversion mechanism 106a and a second rotary-to-linear motion conversion mechanism 106b that press the first piston 105a and the second piston 105b when a braking force by a parking brake is obtained are arranged one by one. The first rotary-to-linear motion conversion mechanism 106a and the second rotary-to-linear motion conversion mechanism 106b are driven by a motor gear unit 107.

The motor gear unit 107 includes a housing (not shown), an electric motor (not shown), and a power distribution mechanism 108. The power distribution mechanism 108 distributes and transmits rotation of the electric motor to the first rotary-to-linear motion conversion mechanism 106a and the second rotary-to-linear motion conversion mechanism 106b, and is disposed inside the housing.

The power distribution mechanism 108 includes an input carrier 109, a first output member 110, a second output member 111, a first intermediate gear 112, and a second intermediate gear 113.

The input carrier 109 includes, on an outer peripheral surface thereof, a teeth portion 109a to which rotation of the electric motor is input. The input carrier 109 is supported by the first output member 110 and the second output member 111 via a pair of one-way clutches 114a and 114b so as to be rotatable only in one direction.

The first output member 110 and the second output member 111 are arranged coaxially with each other, and is rotatably supported by the housing. The first output member 110 meshes with the first intermediate gear 112, and is connected to the first rotary-to-linear motion conversion mechanism 106a so as to be able to transmit power. The second output member 111 meshes with the second intermediate gear 113, and is connected to the second rotary-to-linear motion conversion mechanism 106b so as to be able to transmit power.

The first intermediate gear 112 and the second intermediate gear 113 are rotatably supported by the input carrier 109. Further, the first intermediate gear 112 and the second intermediate gear 113 mesh with each other.

When a service brake is operated by the disc brake apparatus 100 having a related-art structure, brake oil is fed to the first cylinder 104a and the second cylinder 104b provided in the caliper 102 through an oil passage (not shown). Accordingly, the first piston 105a and the second piston 105b are pushed out from the first cylinder 104a and the second cylinder 104b, and the inner pad 103b is pressed against an axially inner surface of a rotor (not shown). Further, the caliper 102 is displaced axially inward with respect to the support 101 by a reaction force caused by the pressing. Then, the outer pad 103a is pressed against an axially outer surface of the rotor by the caliper 102. Accordingly, a braking force is obtained by friction that acts on contact surfaces between the outer pad 103a and the rotor and between the inner pad 103b and the rotor.

On one hand, in order to operate the parking brake by the disc brake apparatus 100, the input carrier 109 is rotated in a predetermined direction by rotationally driving the electric motor in a predetermined direction. Then, the first intermediate gear 112 and the second intermediate gear 113 are revolved.

Then, when magnitudes of rotational loads of the first output member 110 and the second output member 111 are the same as each other, in a state of meshing with each other, the first intermediate gear 112 and the second intermediate gear 113 are only revolved without being rotated on their own axes, and transmit rotation to the first output member 110 and the second output member 111. Therefore, both the first output member 110 that meshes with the first intermediate gear 112 and the second output member 111 that meshes with the second intermediate gear 113 are rotated in the same direction at the same speed.

On the contrary, when the magnitudes of the rotational loads of the first output member 110 and the second output member 111 are different from each other, in a state of meshing with each other, the first intermediate gear 112 and the second intermediate gear 113 are not only revolved but also rotated on their own axes, and transmit the rotation to one or both of the first output member 110 and the second output member 111.

When the rotation is transmitted to the first output member 110 and the second output member 111, the first piston 105a and the second piston 105b are pushed out toward the rotor via the first rotary-to-linear motion conversion mechanism 106a and the second rotary-to-linear motion conversion mechanism 106b, so that the inner pad 103b is pressed against the axially inner surface of the rotor. Further, the caliper 102 is displaced axially inward with respect to the support 101 by the reaction force caused by the pressing. Then, the outer pad 103a is pressed against the axially outer surface of the rotor by the caliper 102. Accordingly, a braking force by the parking brake is obtained by the friction that acts on the contact surfaces between the outer pad 103a and the rotor and between the inner pad 103b and the rotor.

Even when a timing at which the first piston 105a and the second piston 105b press the inner pad 103b is shifted due to a difference in clearance between the first piston 105a and the inner pad 103b, a difference in clearance between the second piston 105b and the inner pad 103b, or the like, a pressing force on the inner pad 103b by the first piston 105a and a pressing force on the inner pad 103b by the second piston 105b can be made uniform.

Further, when the electric motor is rotationally driven in a direction opposite to the predetermined direction in order to release the braking force by the parking brake, the first output member 110 and the second output member 111 can be simultaneously rotated by actions of the one-way clutches 114a and 114b. Therefore, both the pressing force on the inner pad 103b by the first piston 105a and the pressing force on the inner pad 103b by the second piston 105b can be reduced to zero.

Patent Literature 1: JP 2018-184093 A
Patent Literature 2: US 2020/0309214 A

SUMMARY

According to an advantageous aspect of the invention, there is provided a motor gear unit for a disc brake apparatus including: an electric motor; a speed reduction mechanism configured to transmit rotation of the electric motor to a plurality of rotary-to-linear motion conversion mechanisms arranged in a plurality of cylinders provided in a caliper; and a housing accommodating the electric motor and the speed reduction mechanism.

The speed reduction mechanism includes a plurality of final gears connected directly or via another member to the plurality of rotary-to-linear motion conversion mechanisms and a power distribution mechanism that includes one support shaft and that is configured to distribute and transmit input power to the plurality of final gears.

The power distribution mechanism is supported by the housing by supporting and fixing end portions of the support shaft on axially both sides to the housing.

In the motor gear unit for the disc brake apparatus according to the aspect of the present invention, the power distribution mechanism can further include a gear train that includes a plurality of gears and that is unitized.

In the motor gear unit for the disc brake apparatus according to the aspect of the present invention, the gear train can include a first output member and a second output member each of which is the gear, and the first output member and the second output member each can include insertion holes through which the support shaft can be inserted, and can be rotatably supported by the support shaft in a state of being separated from each other in an axial direction of the support shaft.

In the motor gear unit for the disc brake apparatus according to the aspect of the present invention, the gear train can further include an input carrier, a first intermediate gear, and a second intermediate gear each of which is the gear.

Then, the input carrier is rotatably supported around the support shaft via the first output member and the second output member.

Further, the first intermediate gear and the second intermediate gear are rotatably supported by the input carrier, and mesh with each other.

Further, the first output member can mesh with the first intermediate gear and one final gear between the plurality of final gears, and the second output member can mesh with the second intermediate gear and the other final gear between the plurality of final gears.

In the motor gear unit for the disc brake apparatus according to the aspect of the present invention, the power distribution mechanism can further include a biasing member configured to bias the first output member and the second output member in opposite directions in an axial direction of the support shaft between the first output member and the second output member in the axial direction of the support shaft.

In the motor gear unit for the disc brake apparatus according to the aspect of the present invention, the power distribution mechanism can further include a coupling configured to support the biasing member from both sides in the axial direction of the support shaft.

The coupling can include a first coupling member that is supported so as to be relatively rotatable around a center axis of the support shaft with respect to the first output member and that is in contact with an end portion of the biasing member on one side in the axial direction of the support shaft, and a second coupling member that is supported so as to be relatively rotatable around the center axis of the support shaft with respect to the second output member, and that is in contact with an end portion of the biasing member on the other side in the axial direction of the support shaft, and the first coupling member and the second coupling member can be engaged with each other so as not to be relatively rotatable around the center axis of the support shaft, and so as to be relatively displaceable in the axial direction of the support shaft.

In the motor gear unit for the disc brake apparatus according to the aspect of the present invention, the first coupling member can include a first engagement protrusion that protrudes in the axial direction of the support shaft, the second coupling member can include a second engagement protrusion that protrudes in the axial direction of the support shaft, and the first coupling member and the second coupling member cannot be relatively rotatable around the center axis of the support shaft by engaging the first engagement protrusion and the second engagement protrusion with each other.

In the motor gear unit for the disc brake apparatus according to the aspect of the present invention, the first coupling member can include a first base portion supported so as to be relatively rotatable around the center axis of the support shaft with respect to the first output member, the second coupling member can include a second base portion supported so as to be relatively rotatable around the center axis of the support shaft with respect to the second output member, and gaps in the axial direction of the support shaft can be respectively provided between a tip end surface of the first engagement protrusion and the second base portion, and between a tip end surface of the second engagement protrusion and the first base portion.

In the motor gear unit for the disc brake apparatus according to the aspect of the present invention, the first coupling member and the second coupling member can be the same components (common components) having the same shape and the same size.

In the motor gear unit for the disc brake apparatus according to the aspect of the present invention, rotation center axes of the support shaft and the plurality of final gears can be arranged substantially parallel to center axes of the plurality of rotary-to-linear motion conversion mechanisms.

In the motor gear unit for the disc brake apparatus according to the aspect of the present invention, the speed reduction mechanism can further include a drive gear connected to a motor shaft of the electric motor, and a plurality of intermediate transmission gears configured to transmit rotation of the drive gear to the power distribution mechanism, and rotation center axes of the plurality of intermediate transmission gears can be arranged substantially parallel to center axes of the plurality of rotary-to-linear motion conversion mechanisms.

In the motor gear unit for the disc brake apparatus according to the aspect of the present invention, the housing can include a housing main body configured to accommodate the speed reduction mechanism, and a closing plate portion configured to close an opening portion of the housing main body opened in the axial direction of the support shaft, and an end portion of the support shaft on one side in an axial direction can be press-fitted and fixed, molded and fixed, or bonded and fixed to the housing main body.

In the motor gear unit for the disc brake apparatus according to the aspect of the present invention, the closing plate portion can be positioned with respect to the housing main body by using an end portion of the support shaft on the other side in the axial direction.

A disc brake apparatus according to the aspect of the present invention can include: a caliper including a plurality of cylinders on axially inner side of a rotor; a plurality of pistons fitted to the plurality of cylinders; a plurality of rotary-to-linear motion conversion mechanisms that are arranged in the plurality of cylinders, and that are configured to convert a rotary motion into a linear motion to push out the plurality of pistons toward the rotor; and a motor gear unit that is supported by and fixed to the caliper, and that is configured to drive the plurality of rotary-to-linear motion conversion mechanisms, in which the motor gear unit can be the motor gear unit for the disc brake apparatus according to the aspect of the present invention.

DETAILED DESCRIPTION OF EXEMPLIFIED EMBODIMENTS

Figure 1:
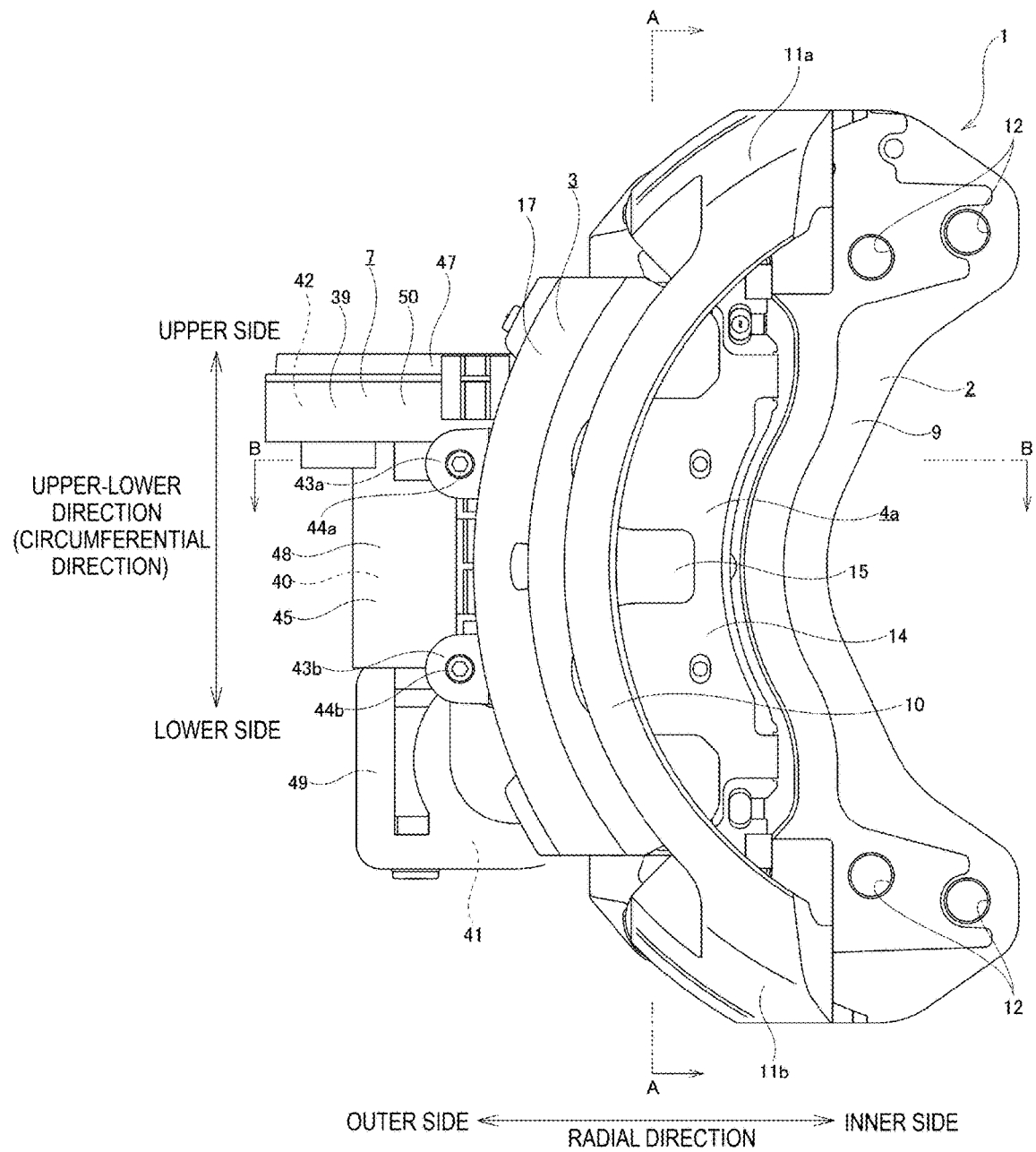
FIG. 1 is a front view of a disc brake apparatus according to a first example of an embodiment when viewed from an outside of a vehicle body in a posture in a state where the disc brake apparatus is attached to a suspension device.

The power distribution mechanism 108 having the related-art structure rotatably supports the first output member 110 and the second output member 111 independently of each other by the housing. Therefore, it is difficult to restrict coaxiality between the first output member 110 and the second output member 111 with high accuracy. Therefore, meshing between teeth portions that constitute the power distribution mechanism 108 may not be appropriate, operation of the power distribution mechanism 108 may be adversely influenced, or an abnormal sound may be generated. Further, the work of assembling the power distribution mechanism 108 into the housing also becomes troublesome.

The present invention has been made to solve the above-described problems, and an object thereof is to provide a motor gear unit for a disc brake apparatus and the disc brake apparatus that can improve coaxiality between a first output member and a second output member.

First Example of Embodiment

A first example of an embodiment will be described with reference to FIGS. 1 to 25.
[Overall Configuration of Disc Brake Apparatus]

The disc brake apparatus 1 of the present example is an electric parking brake type disc brake apparatus, and has both a function as a hydraulic service brake and a function as an electric parking brake.

The disc brake apparatus 1 is a floating type disc brake apparatus, and includes a support 2, a caliper 3, a pair of pads 4a and 4b (an outer pad 4a and an inner pad 4b), two pistons 5a and 5b (a first piston 5a and a second piston 5b), two rotary-to-linear motion conversion mechanisms 6a and 6b (a first rotary-to-linear motion conversion mechanism 6a and a second rotary-to-linear motion conversion mechanism 6b), and a motor gear unit 7.

The disc brake apparatus 1 of the present example is incorporated in a relatively large vehicle. Therefore, the disc brake apparatus 1 includes two pistons 5a and 5b and two rotary-to-linear motion conversion mechanisms 6a and 6b, but may include three or more pistons 5a and 5b and three or more rotary-to-linear motion conversion mechanisms 6a and 6b.

The disc brake apparatus 1 obtains a braking force by the service brake by feeding brake oil (pressure oil) that is operational oil to a first cylinder 20a and a second cylinder 20b provided at the caliper 3. On the contrary, the disc brake apparatus 1 obtains a braking force by the parking brake by driving the first rotary-to-linear motion conversion mechanism 6a and the second rotary-to-linear motion conversion mechanism 6b by the motor gear unit 7 without using the operational oil.

Figure 9:
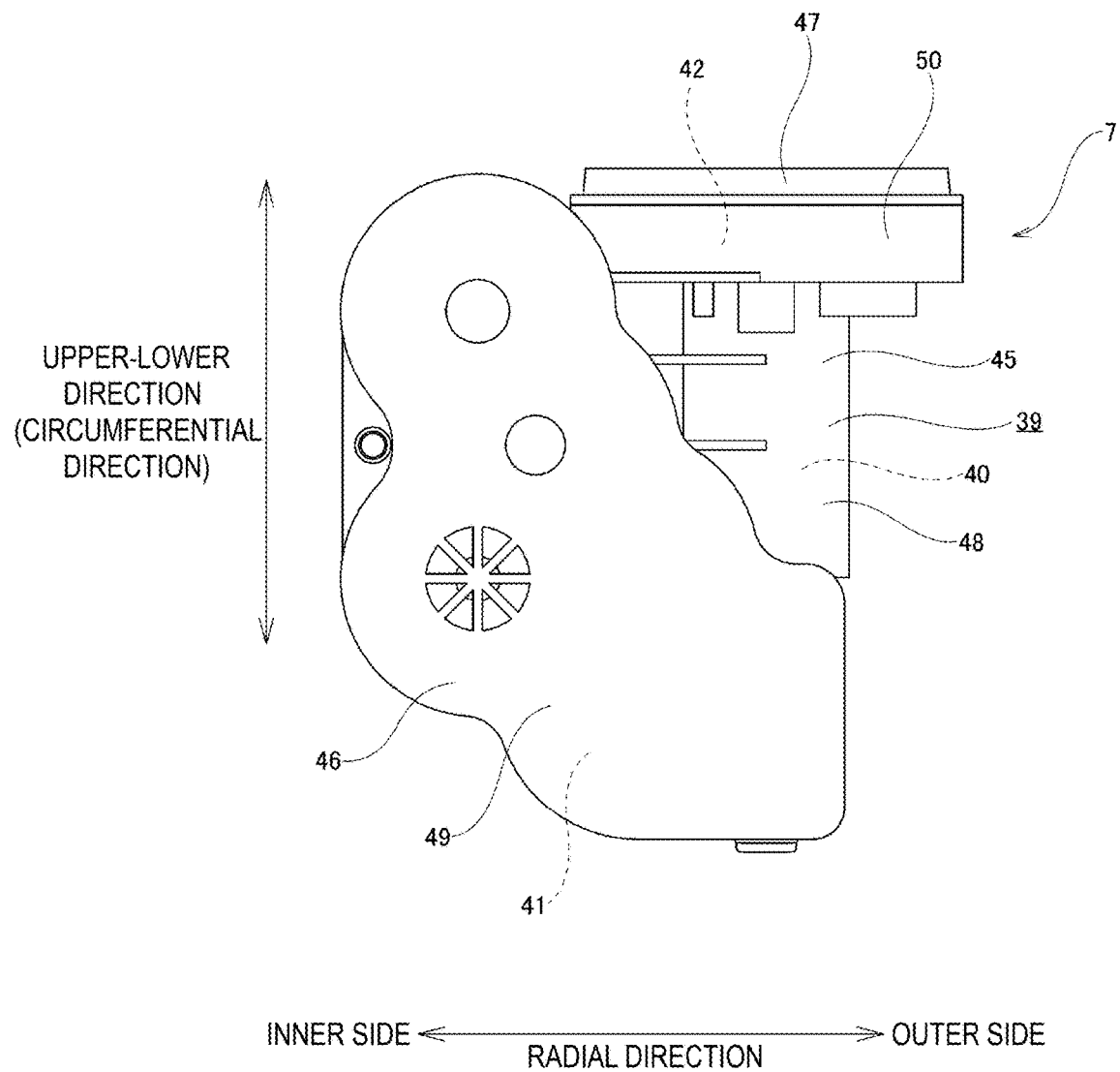
FIG. 9 is a rear view of the motor gear unit removed from the disc brake apparatus according to the first example of the embodiment when viewed from the central side of the vehicle body.
Figure 10:
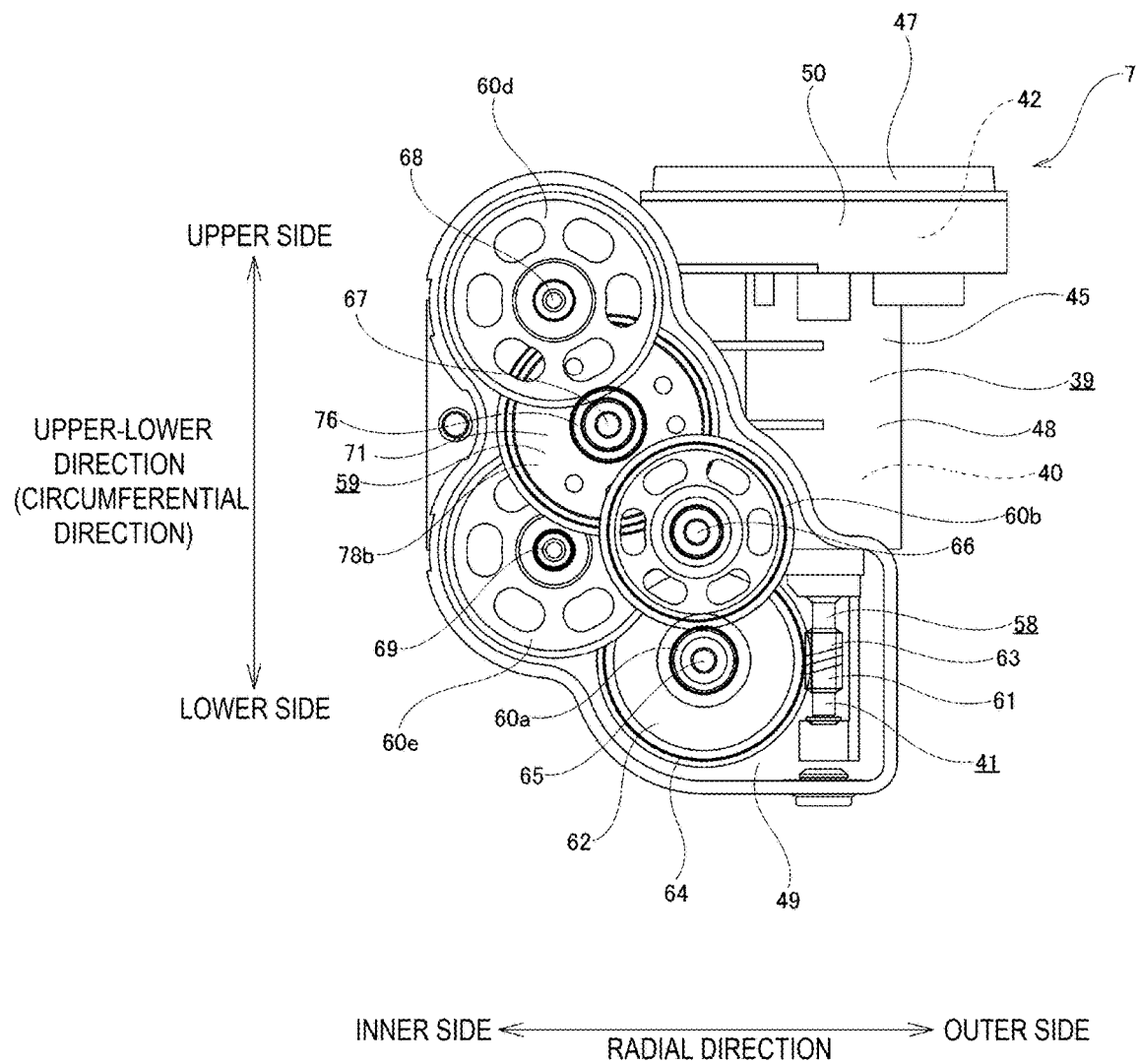
FIG. 10 is a rear view showing the motor gear unit according to the first example of the embodiment in which a closing plate portion is removed from a state shown in FIG. 9.

In the following description of the disc brake apparatus 1, unless otherwise specified, an axial direction, a circumferential direction, and a radial direction refer to an axial direction, a circumferential direction, and a radial direction of a disc-shaped rotor 8 (see FIG. 7) that rotates together with a wheel. A front-back direction in FIGS. 1, 2, 8, 9, and 10, an upper-lower direction in FIGS. 3 and 7, and a left-right direction in FIG. 6 correspond to the axial direction. A central side of a vehicle body in a state of being attached to the vehicle body is referred to as an axially inner side, and an outer side of the vehicle body in the state of being attached to the vehicle body is referred to as an axially outer side. Further, an upper-lower direction in FIGS. 1, 2, 6, 8, 9, 10, and 11 and a front-back direction in FIGS. 3 and 7 correspond to the circumferential direction, and correspond to the upper-lower direction in the state of being attached to the vehicle body. Further, a left-right direction in FIGS. 1 to 3, and FIGS. 7 to 11, and a front-back direction in FIG. 6 correspond to the radial direction. A left side in FIGS. 1, 3, 7, and 8 and a right side in FIGS. 2, 9, and 10 are radially outer sides, and a right side in FIGS. 1, 3, 7, and 8 and a left side in FIGS. 2, 9, and 10 are radially inner sides.
(Support)

The support 2 is a cast product of an iron-based alloy such as cast iron, and includes a support base portion 9 disposed on an axially inner side of the rotor 8, an outer coupling portion 10 disposed on an axially outer side of the rotor 8, and a pair of coupling arm portions 11a and 11b that respectively couple end portions on circumferentially both outer sides of the support base portion 9 and end portions on circumferentially both outer sides of the outer coupling portion 10 in the axial direction. A guide hole (not shown) that is opened axially inward is formed in a radially outer portion (rotor path portion) of each of the coupling arm portions 11a and 11b. The support 2 is fixed to a suspension device that constitutes the vehicle body by using a plurality of (four in the shown example) attachment holes 12 formed in a radially inner portion of the support base portion 9.

Figure 2:
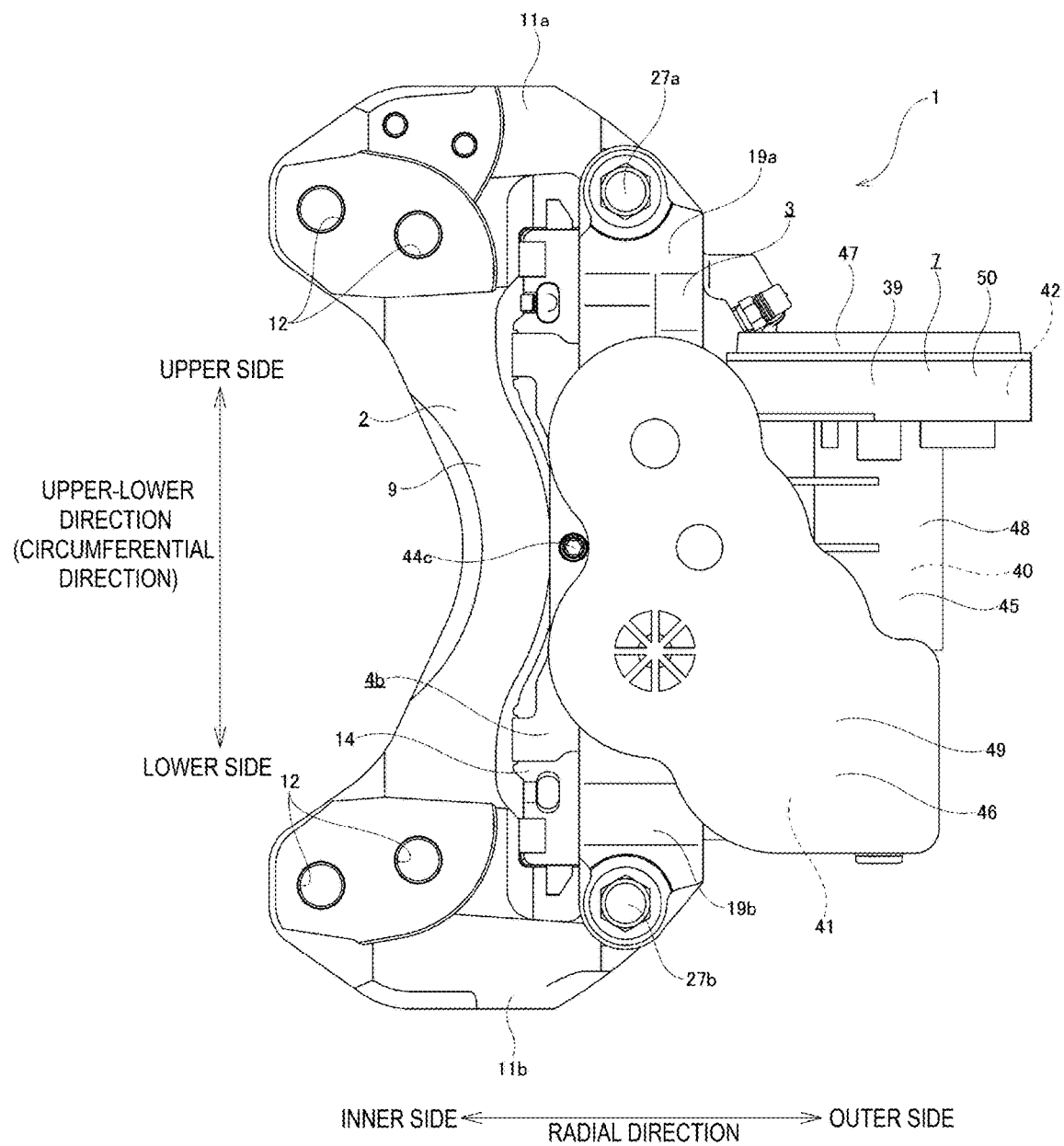
FIG. 2 is a rear view of the disc brake apparatus according to the first example of the embodiment when viewed from a central side of the vehicle body in the posture in the state where the disc brake apparatus is attached to the suspension device.
Figure 3:
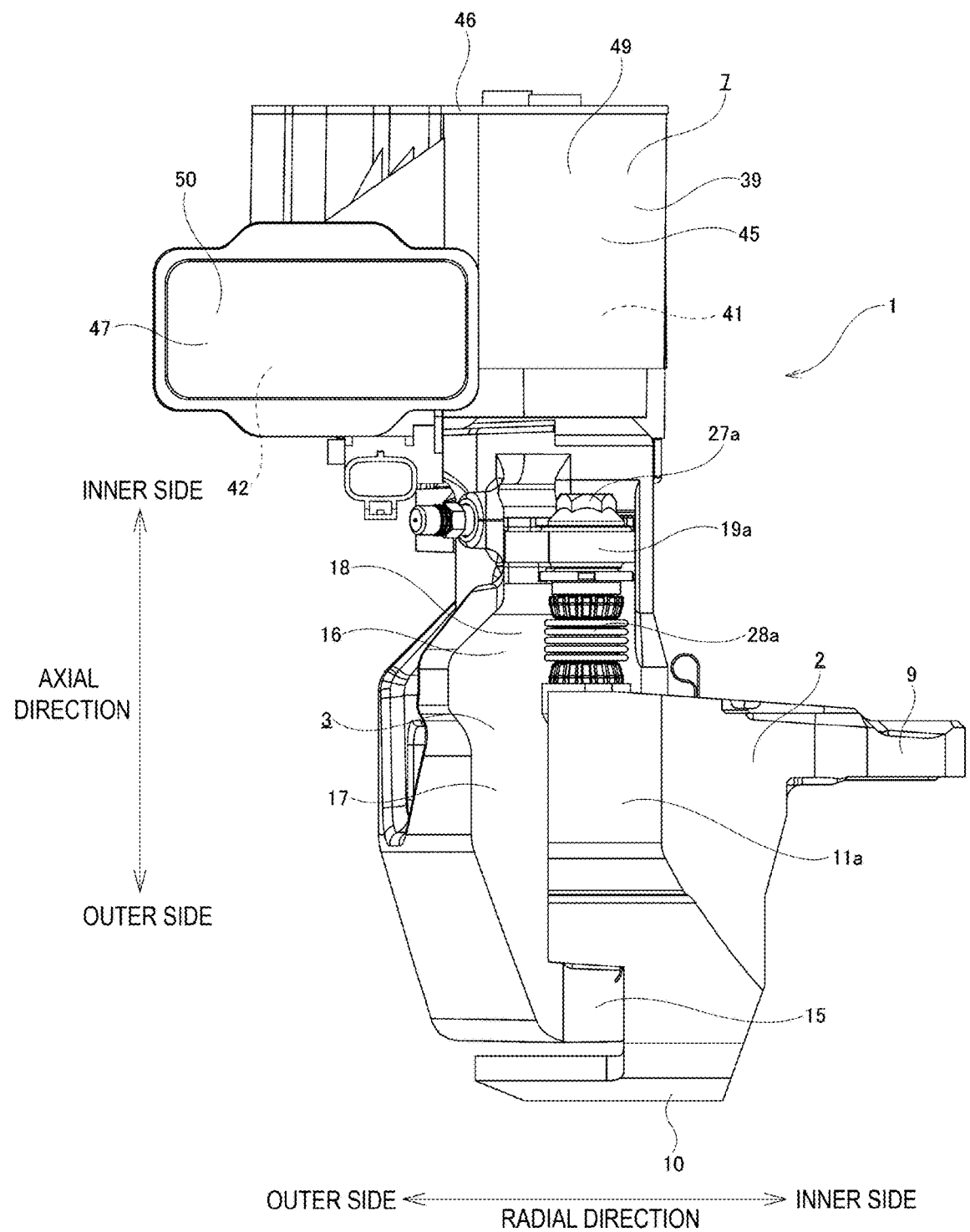
FIG. 3 is a plan view of the disc brake apparatus according to the first example of the embodiment when viewed from an upper side in FIG. 1.
Figure 4:
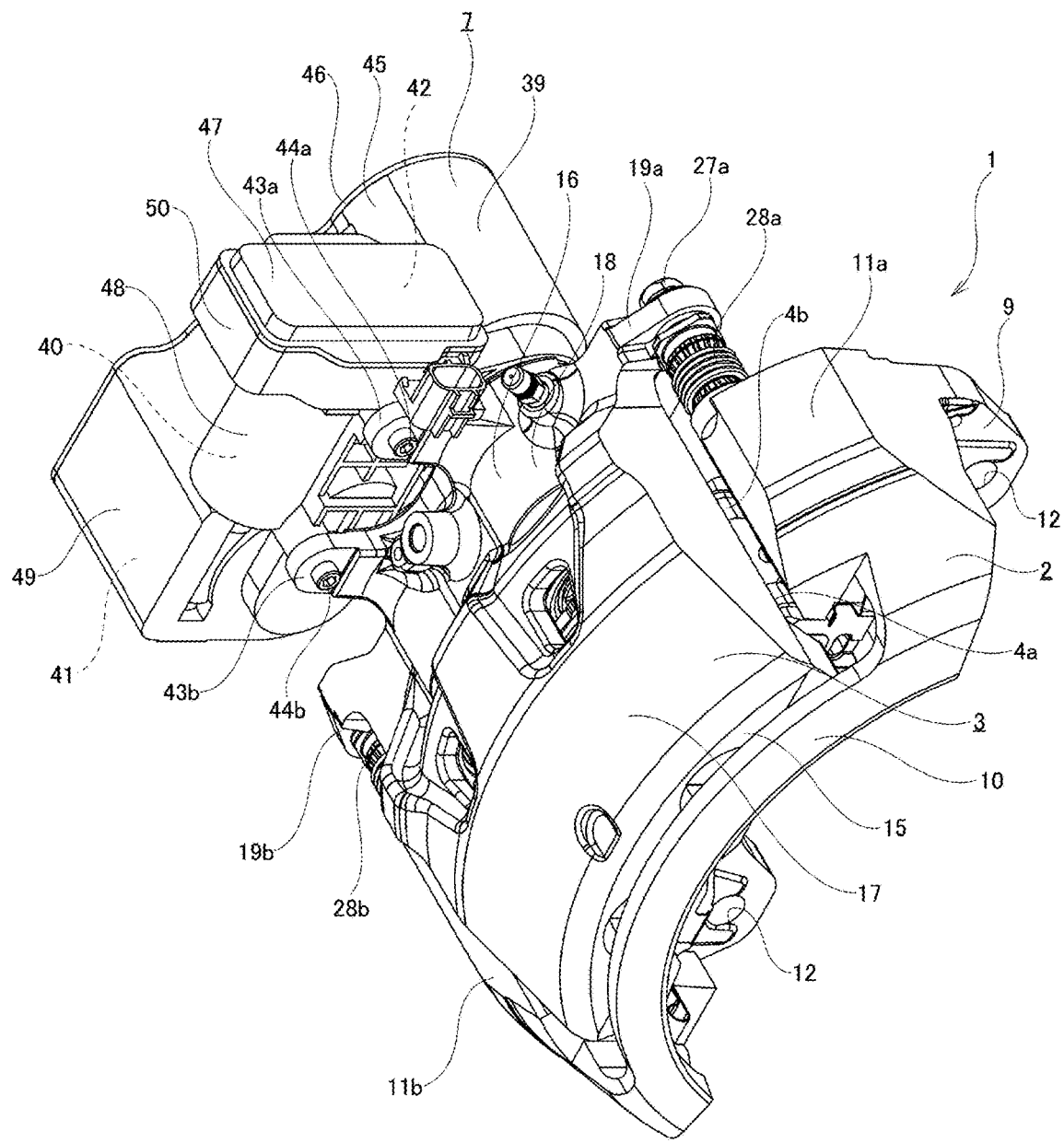
FIG. 4 is a perspective view of the disc brake apparatus according to the first example of the embodiment when viewed from the outside of the vehicle body and a radially outer side.
Figure 5:
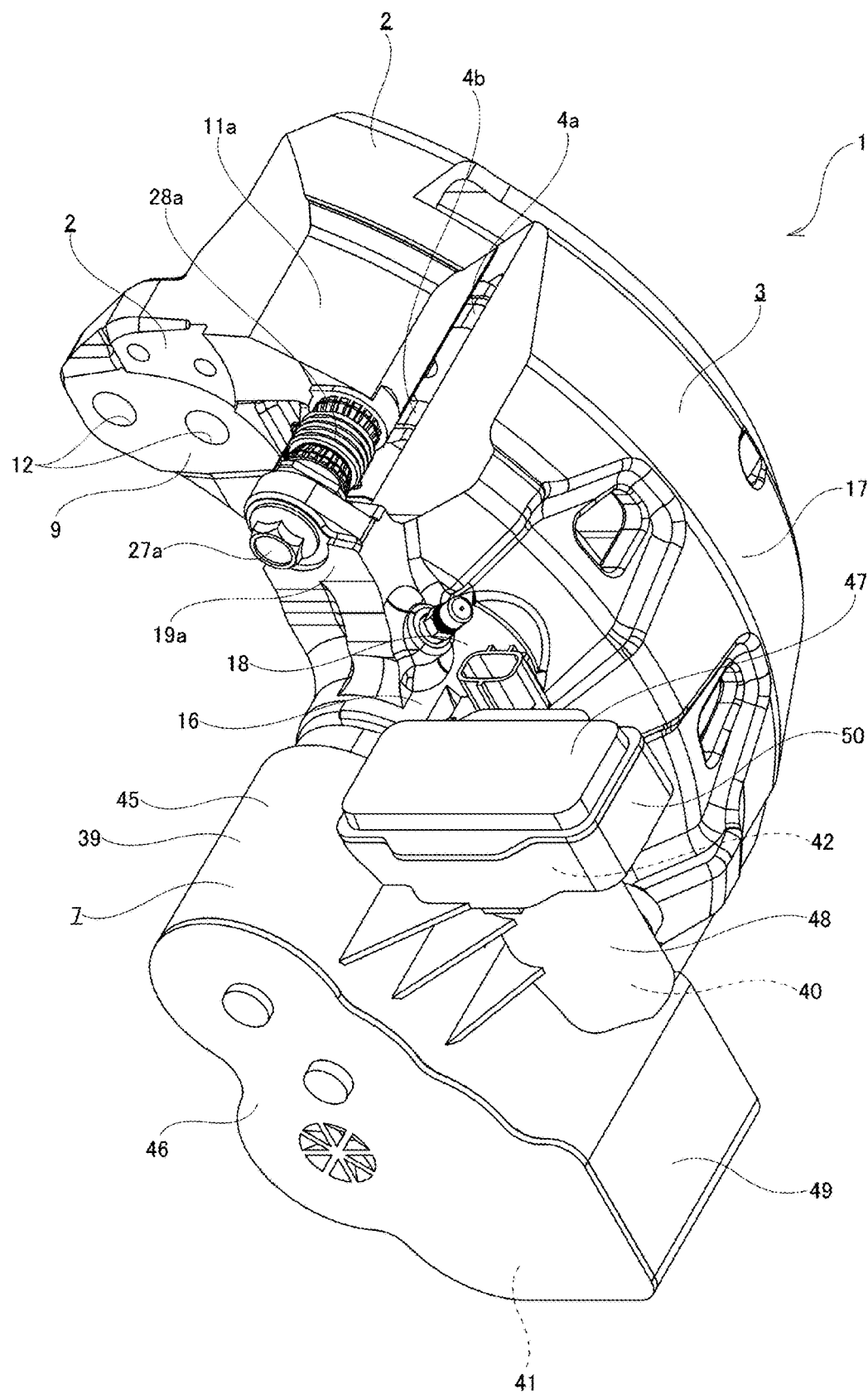
FIG. 5 is a perspective view of the disc brake apparatus according to the first example of the embodiment when viewed from the central side of the vehicle body and the radially outer side.

In the disc brake apparatus 1 of the present example, in a state where the support 2 is fixed to the suspension device, as shown in FIGS. 1 and 2, one coupling arm portion 11a is disposed on an upper side in the upper-lower direction, and the other coupling arm portion 11b is disposed on a lower side in the upper-lower direction. However, when the present invention is carried out, an assembling direction of the disc brake apparatus is not particularly limited.
(Outer Pad and Inner Pad)

The outer pad 4a and the inner pad 4b are arranged on axially both sides of the rotor 8. Specifically, the outer pad 4a is disposed on an axially outer side of the rotor 8, and is supported so as to be displaceable with respect to the support 2 in the axial direction. Further, the inner pad 4b is disposed on an axially inner side of the rotor 8, and is supported so as to be displaceable with respect to the support 2 in the axial direction.

Each of the outer pad 4a and the inner pad 4b includes a lining (friction material) 13 and a metal-made back plate (pressure plate) 14 that supports a back surface of the lining 13.
(Caliper)

The caliper 3 is made of an aluminum-based alloy or an iron-based alloy and has an inverted U-shape. The caliper 3 includes a pressing portion 15 on an axially outer portion and a clamp base portion 16 on an axially inner portion. Further, the caliper 3 includes a bridge portion 17 that is disposed on the radially outer side of the rotor 8 and couples the pressing portion 15 and the clamp base portion 16 in the axial direction.

The clamp base portion 16 includes a base portion main body 18 and a pair of arm portions 19a and 19b that extend from the base portion main body 18 to circumferentially both outer sides. The base portion main body 18 includes the first cylinder 20a and the second cylinder 20b, each of which is a substantially columnar space therein. The first cylinder 20a and the second cylinder 20b are opened to an axially outer side, but openings on an axially inner side are closed by bottom portions 21a and 21b.

The first piston 5a is fitted into the first cylinder 20a, and the second piston 5b is fitted into the second cylinder 20b. Each of the first piston 5a and the second piston 5b is made of carbon steel, such as S10C or S45C, and is formed in a bottomed cylindrical shape.

Female splines 23a and 23b are provided on inner peripheral surfaces of the first piston 5a and the second piston 5b. A portion between an outer peripheral surface of the first piston 5a and an inner peripheral surface of the first cylinder 20a and a portion between an outer peripheral surface of the second piston 5b and an inner peripheral surface of the second cylinder 20b are sealed by annular piston seals 24a and 24b. The piston seals 24a and 24b are mounted in seal grooves 25a and 25b formed in inner peripheral surfaces of axially outer portions of the first cylinder 20a and the second cylinder 20b.

The axially outer portions of the first piston 5a and the second piston 5b are prevented from rotating with respect to the back plate 14 of the inner pad 4b by a rotation-preventing mechanism (not shown). A piston boot 26a is bridged over a portion between an axially outer portion of the outer peripheral surface of the first piston 5a and an opening edge portion of the first cylinder 20a on an axially outer side, and a piston boot 26b is bridged over a portion between an axially outer portion of the outer peripheral surface of the second piston 5b and an opening edge portion of the second cylinder 20b on an axially outer side.

The caliper 3 is supported so as to be displaceable with respect to the support 2 in the axial direction. For this reason, end portions of guide pins 27a and 27b on an axially inner side are fixed to the pair of arm portions 19a and 19b that constitute the clamp base portion 16, and end portions and intermediate portions of the guide pins 27a and 27b on an axially outer side are inserted into guide holes formed in the pair of coupling arm portions 11a and 11b that constitute the support 2 so as to be relatively displaceable in the axial direction. Further, boots 28a and 28b are bridged between outer peripheral surfaces of the guide pins 27a and 27b and opening portions of the guide holes.

(Rotary-to-Linear Motion Conversion Mechanism)

Figure 6:
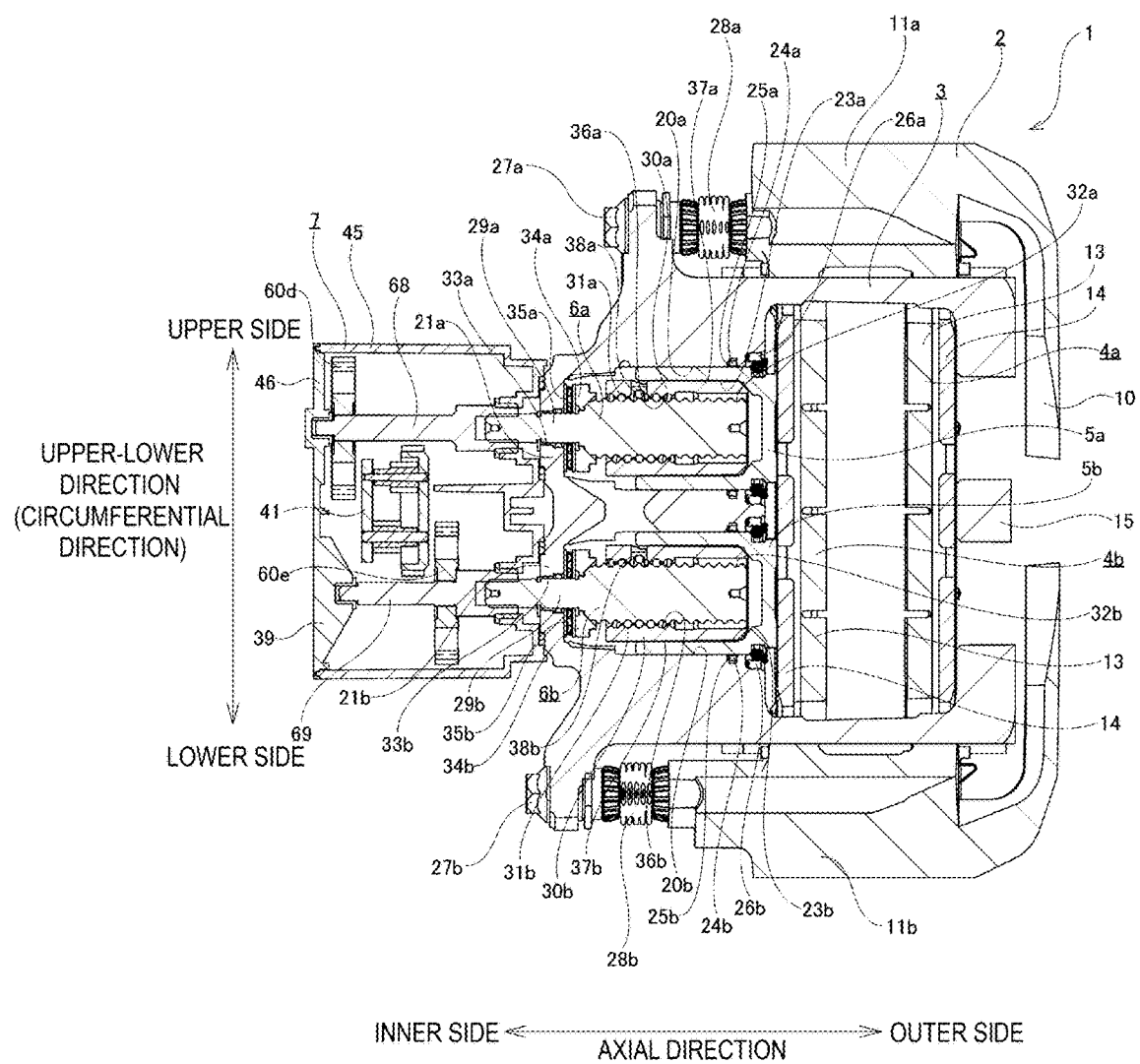
FIG. 6 is a cross-sectional view taken along a line A-A in FIG. 1.
Figure 7:
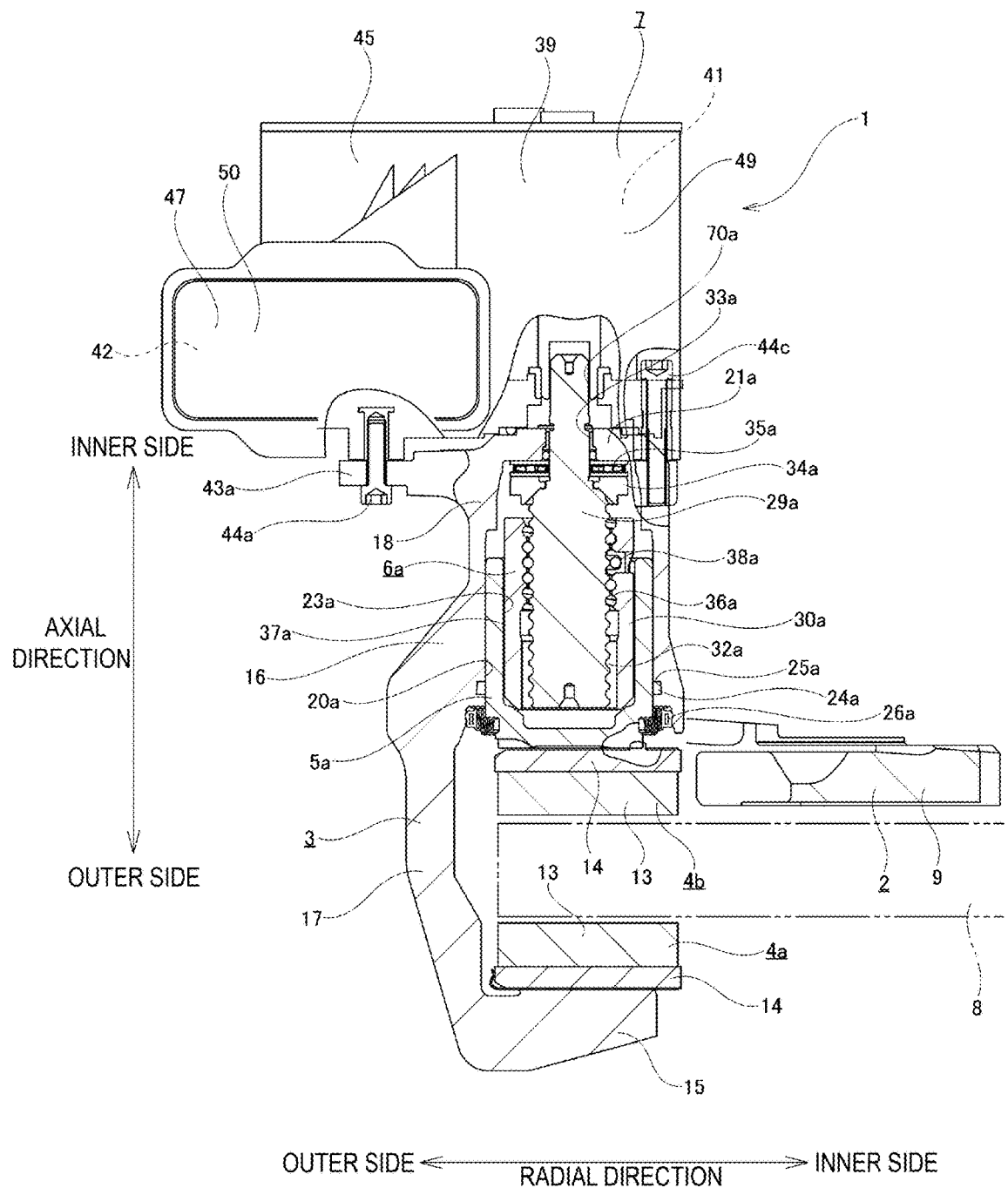
FIG. 7 is a cross-sectional view taken along a line B-B in FIG. 1.

As shown in FIGS. 6 and 7, the first rotary-to-linear motion conversion mechanism 6a and the second rotary-to-linear motion conversion mechanism 6b are feed screw mechanisms (ball screw devices) that convert rotary motion into linear motion and that change an overall length in the axial direction during operation, and respectively include spindles 29a and 29b that are rotary members, nuts 30a and 30b that are linear motion members, and a plurality of balls 31a and 31b. The first rotary-to-linear motion conversion mechanism 6a pushes out the first piston 5a toward the rotor 8, and the second rotary-to-linear motion conversion mechanism 6b pushes out the second piston 5b toward the rotor 8.

When the present invention is carried out, it is also possible to use a sliding feed screw device in which the spindle and the nut are in direct contact with each other without a ball interposed therebetween.

The spindles 29a and 29b respectively include spiral shaft-side ball screw grooves 32a and 32b in outer peripheral surfaces ranging from tip end portions (axially outer portions) to intermediate portions. Base end portions (axially inner portions) of the spindles 29a and 29b are inserted through through holes 33a and 33b formed in the bottom portions 21a and 21b of the clamp base portion 16, and are connected to tip end portions of a first output shaft 68 and a second output shaft 69, which will be described later, so as not to be relatively rotatable.

Annular support rings 34a and 34b are externally fitted to portions near the base ends of the spindles 29a and 29b so as not to be relatively rotatable. Thrust bearings 35a and 35b are arranged between an axially inner surface of the support rings 34a and 34b and an axially outer surface of the bottom portions 21a and 21b. Accordingly, axial loads (axial forces) that act on the spindles 29a and 29b can be supported by the bottom portions 21a and 21b, and the spindles 29a and 29b can be relatively rotated with respect to the bottom portions 21a and 21b.

The nuts 30a and 30b respectively include spiral nut-side ball screw grooves 36a and 36b in inner peripheral surfaces, and male splines 37a and 37b on outer peripheral surfaces. In a state where the nut 30a is disposed inside the first piston 5a, the male spline 37a is spline-engaged with the female spline 23a provided in the first piston 5a. Further, in a state where the nut 30b is disposed inside the second piston 5b, the male spline 37b is spline-engaged with the female spline 23b provided in the second piston 5b. Accordingly, the nut 30a is engaged with the first piston 5a so as to be relatively displaceable in the axial direction and so as not to be relatively rotatable, and the nut 30b is engaged with the second piston 5b so as to be relatively displaceable in the axial direction and so as not to be relatively rotatable.

The plurality of balls 31a and 31b are rotatably arranged inside a spiral load path formed between the shaft-side ball screw grooves 32a and 32b and the nut-side ball screw grooves 36a and 36b. A start point and an end point of the load path are connected by circulation components 38a and 38b fixed to the nuts 30a and 30b.

The first rotary-to-linear motion conversion mechanism 6a and the second rotary-to-linear motion conversion mechanism 6b of the present example move the nuts 30a and 30b in the axial direction by rotationally driving the spindles 29a and 29b. Specifically, when the spindles 29a and 29b are rotationally driven in a forward rotation direction, the nuts 30a and 30b are moved in a direction approaching the rotor 8 (axially outward). On the contrary, when the spindles 29a and 29b are rotationally driven in a reverse rotation direction, the nuts 30a and 30b are moved in a direction away from the rotor 8 (axially inward).

(Motor Gear Unit)

The motor gear unit (MGU, electric drive device) 7 is for electrically driving the first rotary-to-linear motion conversion mechanism 6a and the second rotary-to-linear motion conversion mechanism 6b, and includes a housing 39, an electric motor 40, a speed reduction mechanism 41, and a non-excited operation type brake 42.

<Housing>

The housing 39 is made of synthetic resin or metal, and is supported by and fixed to the clamp base portion 16 that constitutes the caliper 3. Specifically, the housing 39 is supported by and fixed to an axially inner side of the clamp base portion 16 by using attachment bolts 44a and 44b inserted through a pair of attachment flange portions 43a and 43b provided on an outer peripheral surface of the clamp base portion 16 and an attachment bolt 44c inserted through a radially inner portion of the housing 39 in the axial direction.

The housing 39 includes a housing main body 45, a closing plate portion 46, and a lid body 47. The housing main body 45 includes a motor accommodating portion 48, a gear accommodating portion 49, and a brake accommodating portion 50 each having a hollow shape.

The motor accommodating portion 48 is a portion that accommodates the electric motor 40 therein. In the shown example, the motor accommodating portion 48 has a cylindrical shape having an inner diameter slightly larger than an outer diameter of a motor main body 53 (described later) that constitutes the electric motor 40.

The gear accommodating portion 49 is a portion that accommodates the speed reduction mechanism 41 therein. In the shown example, the gear accommodating portion 49 is configured as a housing having a larger volume than that of the motor accommodating portion 48.

Figure 8:
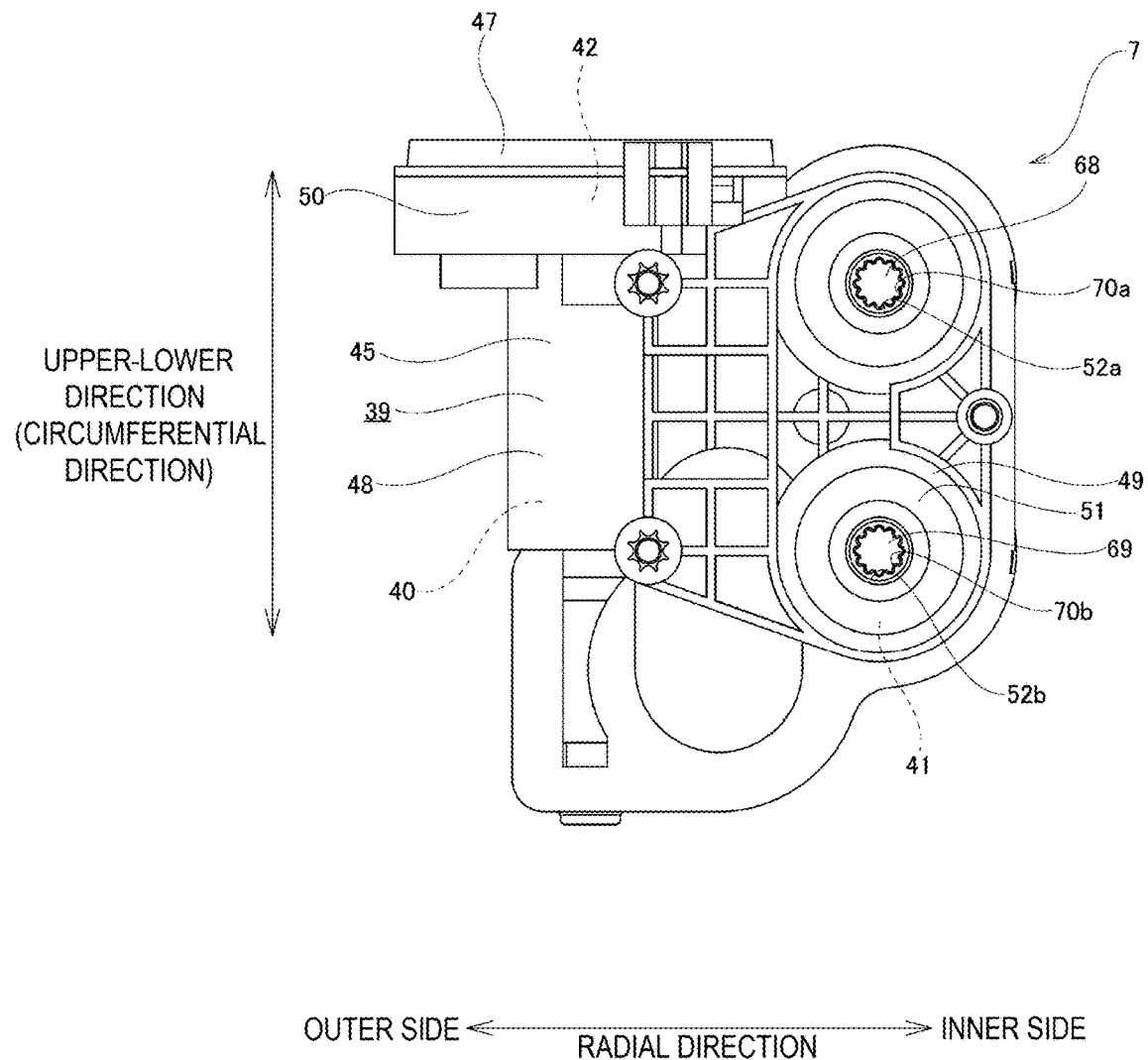
FIG. 8 is a front view of a motor gear unit removed from the disc brake apparatus according to the first example of the embodiment when viewed from the outside of the vehicle body.

As shown in FIG. 8, two insertion holes 52a and 52b into which the base end portions of the spindles 29a and 29b can be inserted are opened in a side wall portion 51 that constitutes an axially inner surface of the gear accommodating portion 49. Center axes of the insertion holes 52a and 52b are arranged toward the axial direction. An opening portion of the gear accommodating portion 49 on an axially outer side is closed by the closing plate portion 46.

The brake accommodating portion 50 is a portion that accommodates the non-excited operation type brake 42 therein. In the shown example, the brake accommodating portion 50 is formed in a rectangular housing shape. An opening portion of the brake accommodating portion 50 on an upper side is closed by the lid body 47.

<Electric Motor>

Figure 13:
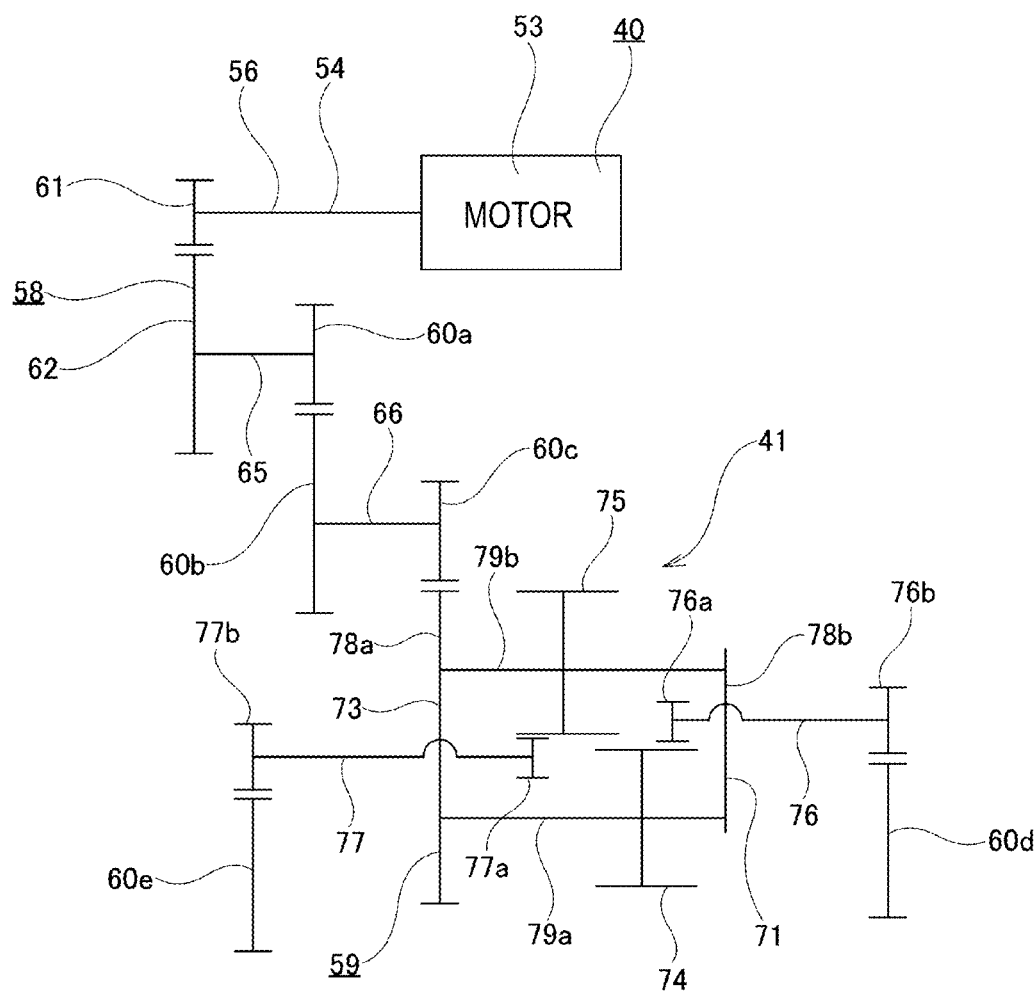
FIG. 13 is a schematic diagram showing a speed reduction mechanism according to the first example of the embodiment.
Figure 14:
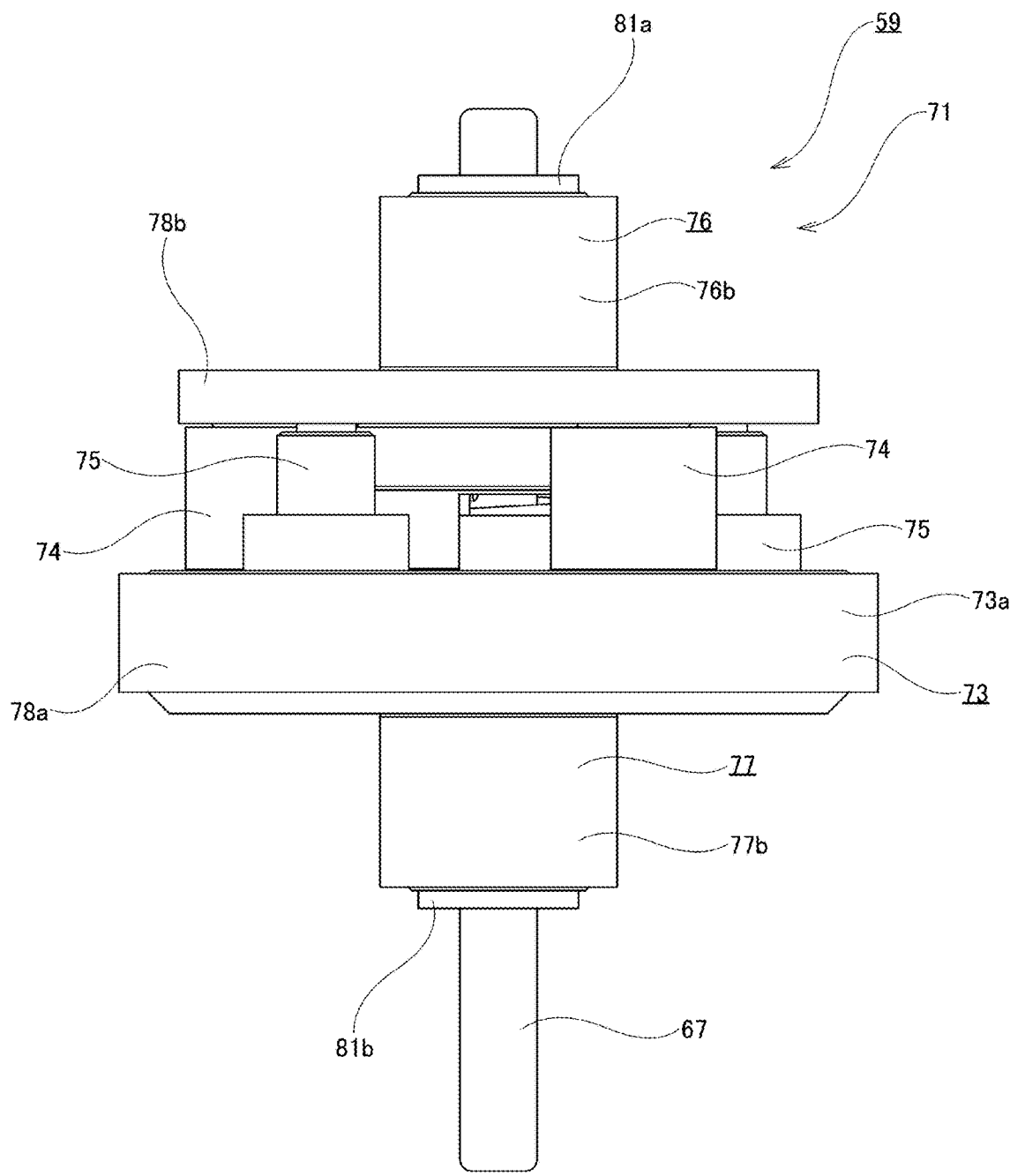
FIG. 14 is a view of a power distribution mechanism according to the first example of the embodiment when viewed from a radially outer side of a support shaft in which the power distribution mechanism is taken out.
Figure 15:
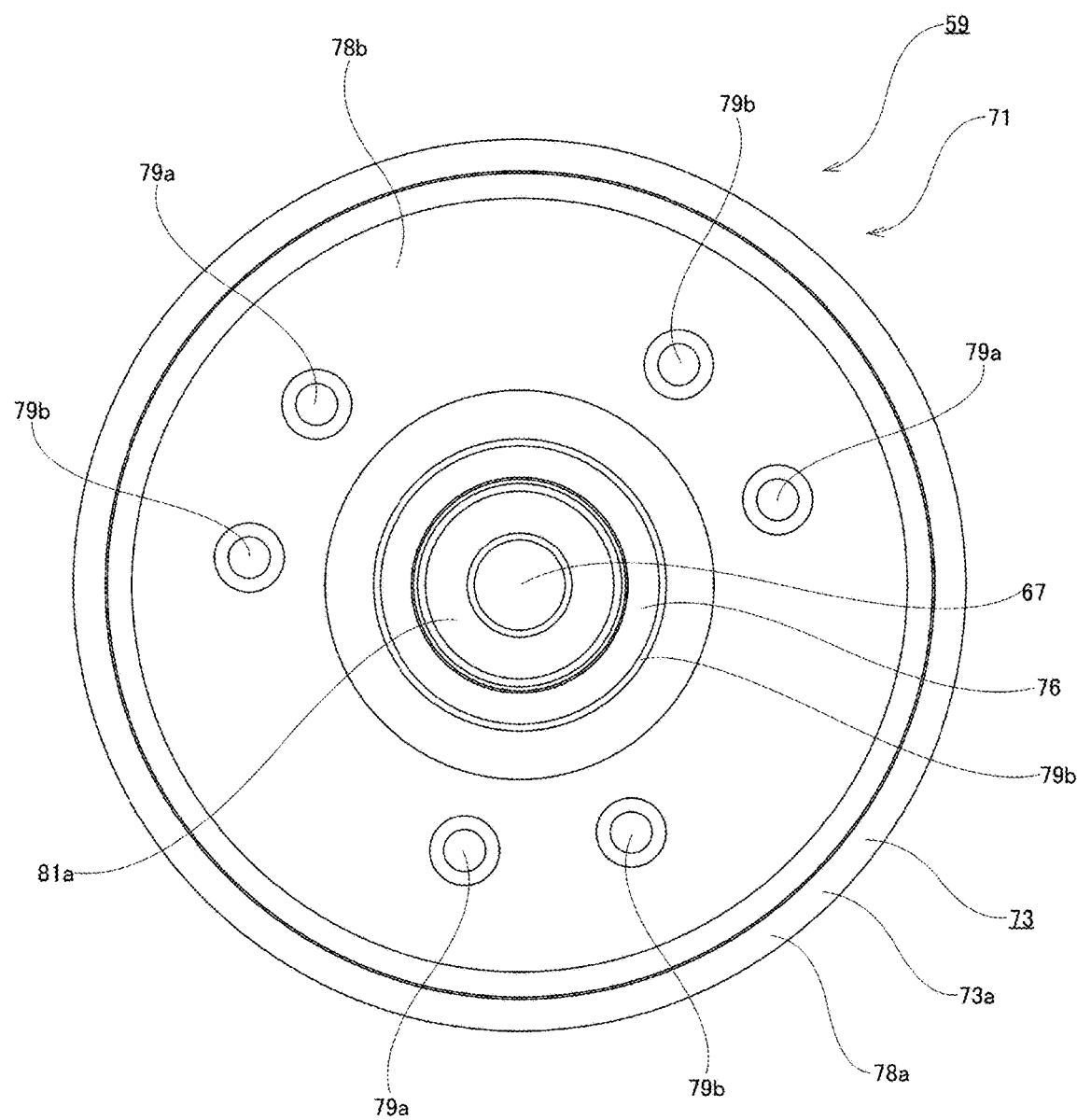
FIG. 15 is a view of the power distribution mechanism according to the first example of the embodiment when viewed from an axial direction of the support shaft in which the power distribution mechanism is taken out.
Figure 16:
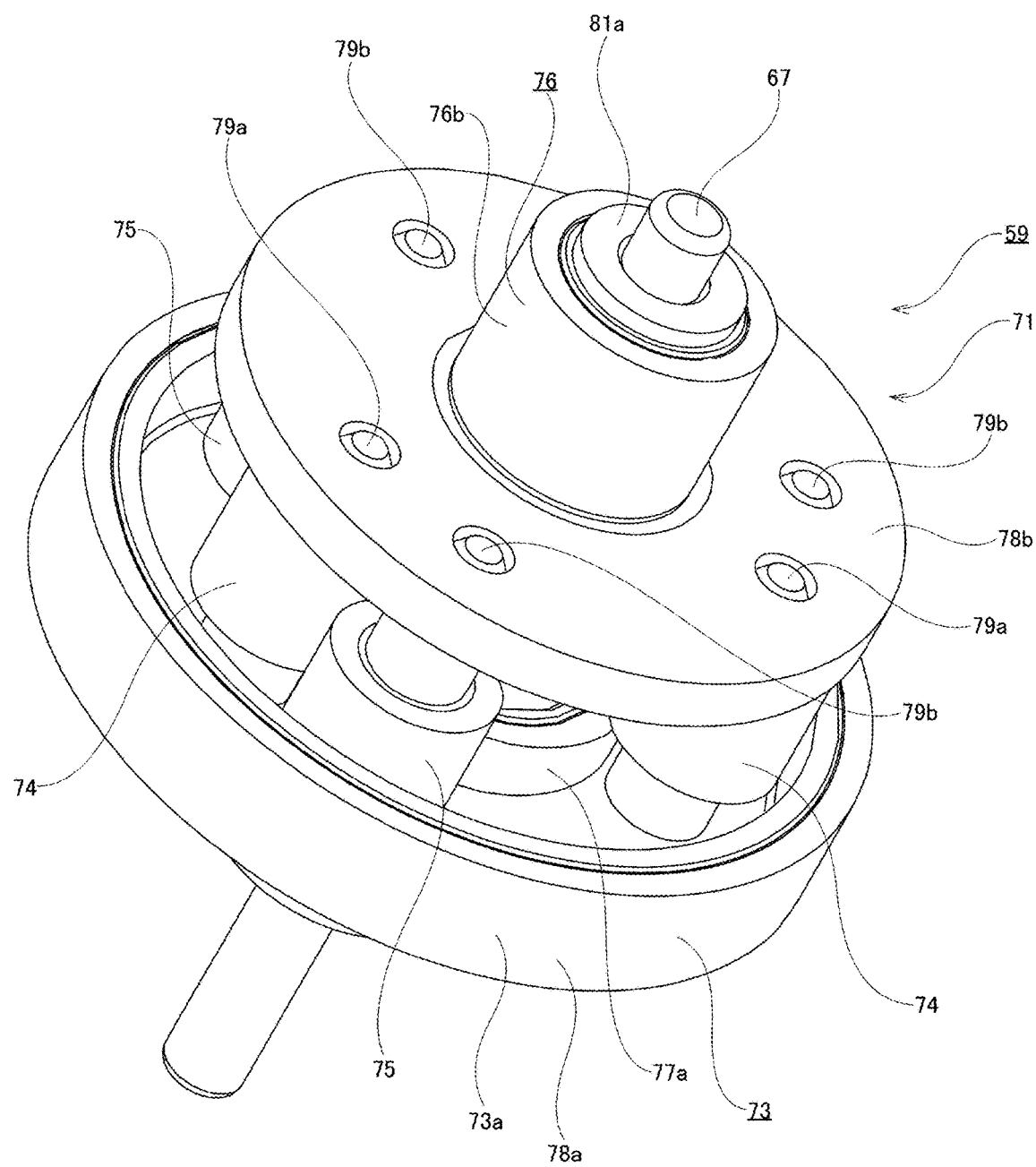
FIG. 16 is a perspective view showing the power distribution mechanism according to the first example of the embodiment in which the power distribution mechanism is taken out.
Figure 17:
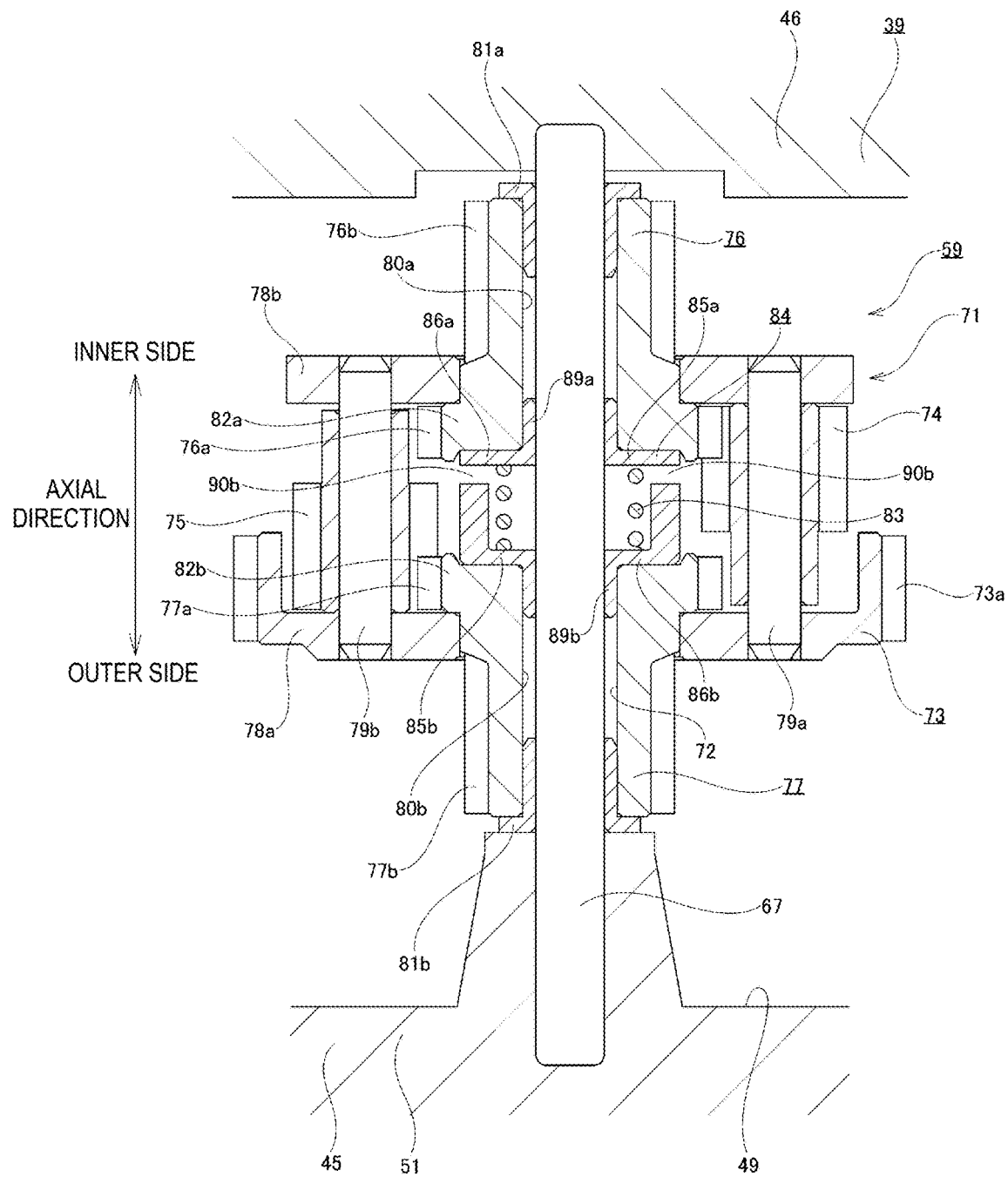
FIG. 17 is a cross-sectional view showing an assembled state of the power distribution mechanism according to the first example of the embodiment.
Figure 18:
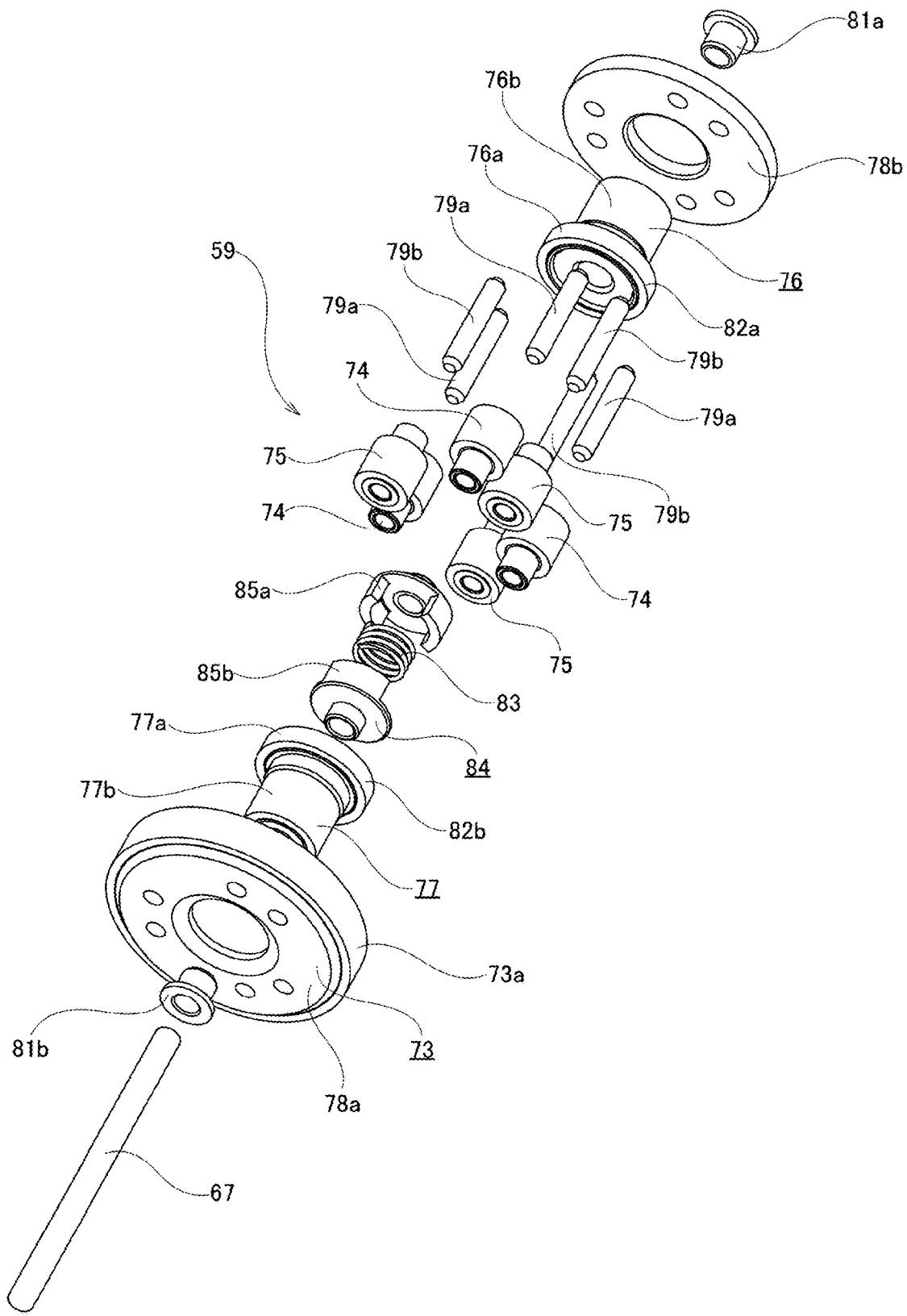
FIG. 18 is an exploded perspective view showing the power distribution mechanism according to the first example of the embodiment in which the power distribution mechanism is taken out.
Figure 19:
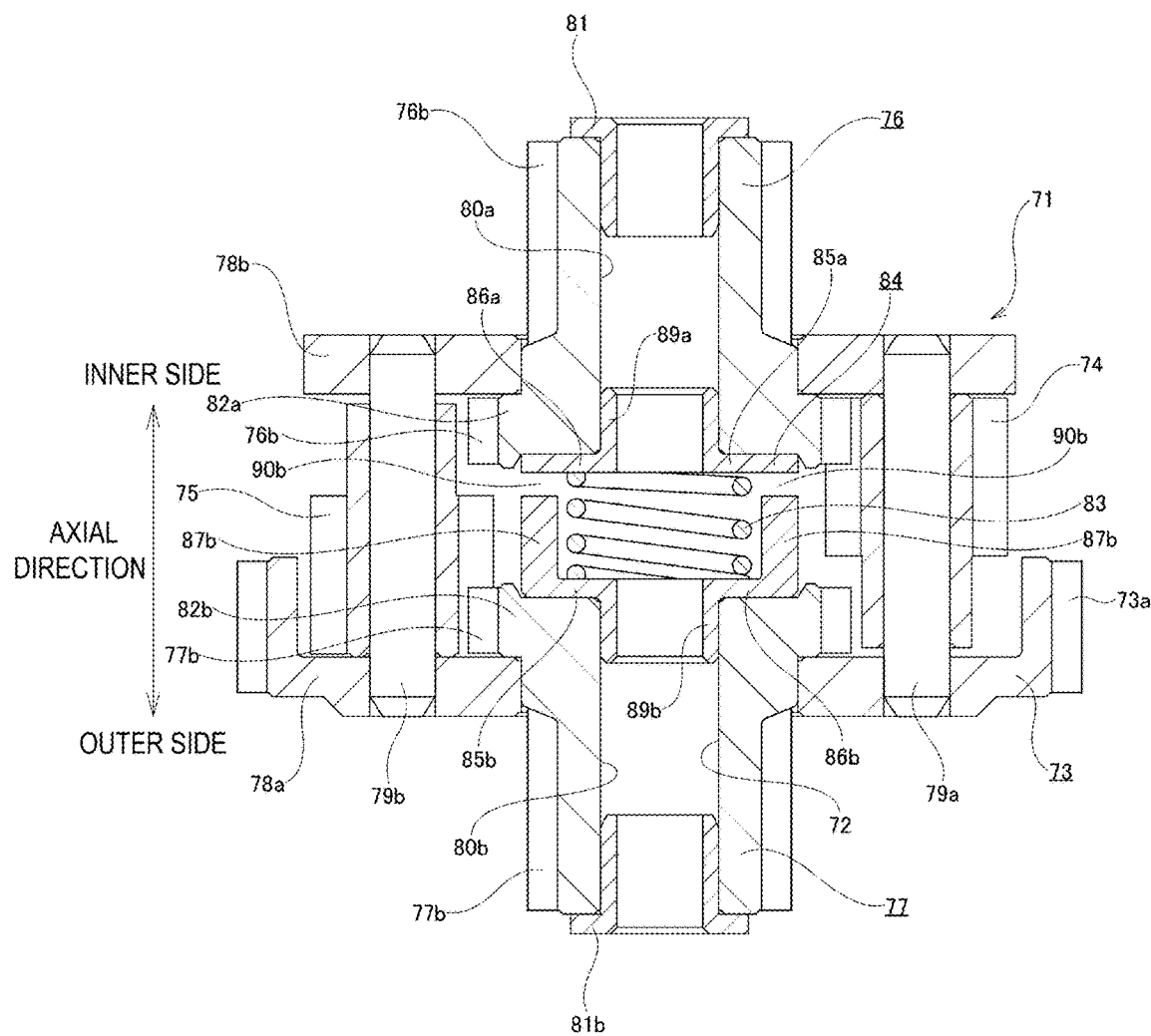
FIG. 19 is a cross-sectional view showing the power distribution mechanism according to the first example of the embodiment in which the support shaft is omitted from the power distribution mechanism.
Figure 20:
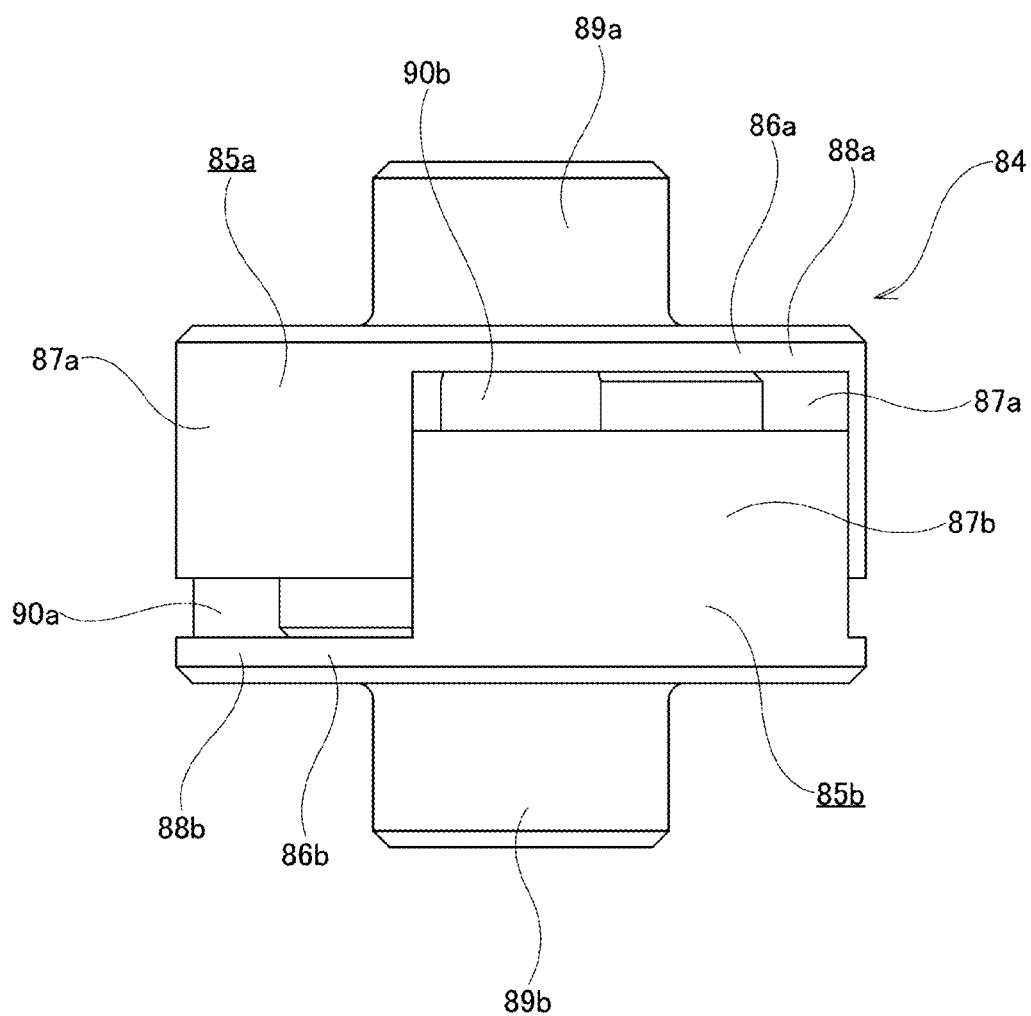
FIG. 20 is a view of a coupling that constitutes the power distribution mechanism according to the first example of the embodiment when viewed from a radially outer side in which the coupling is taken out.
Figure 21:
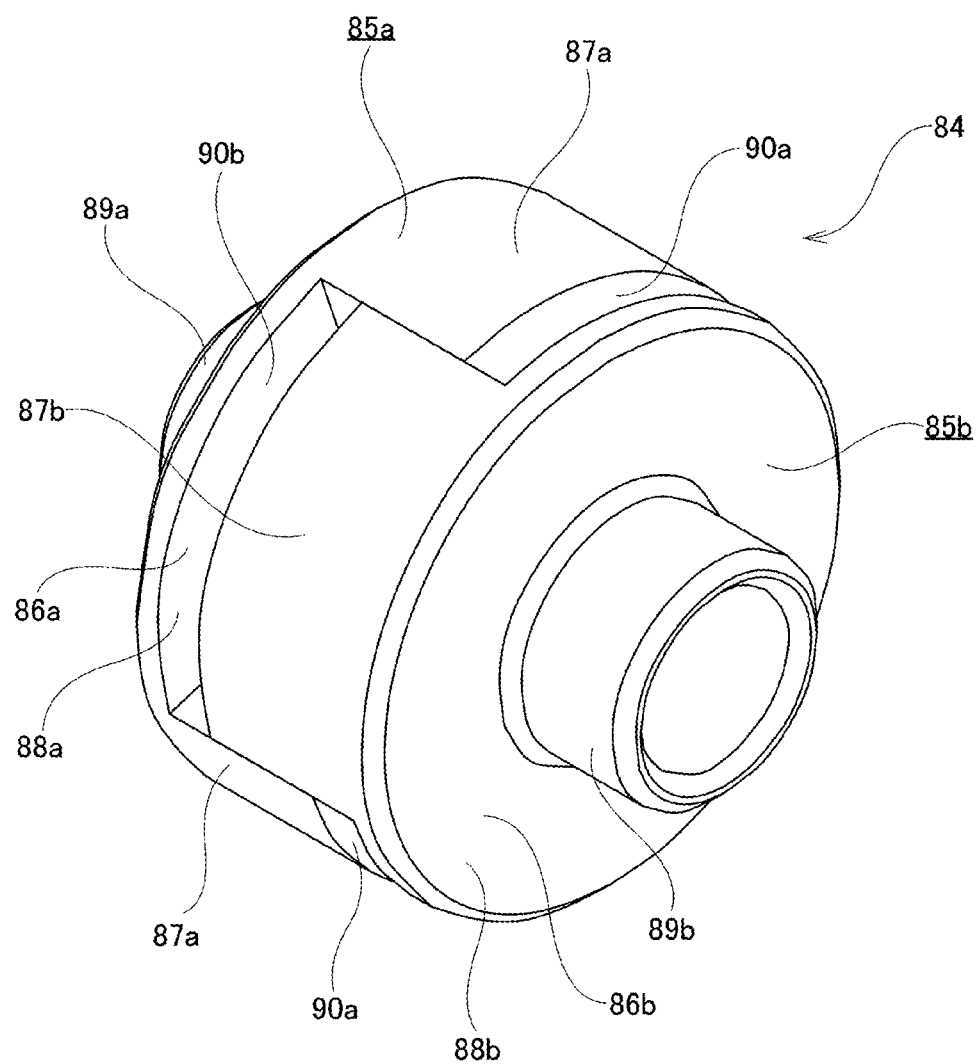
FIG. 21 is a perspective view showing the coupling that constitutes the power distribution mechanism according to the first example of the embodiment in which the coupling is taken out.
Figure 22:
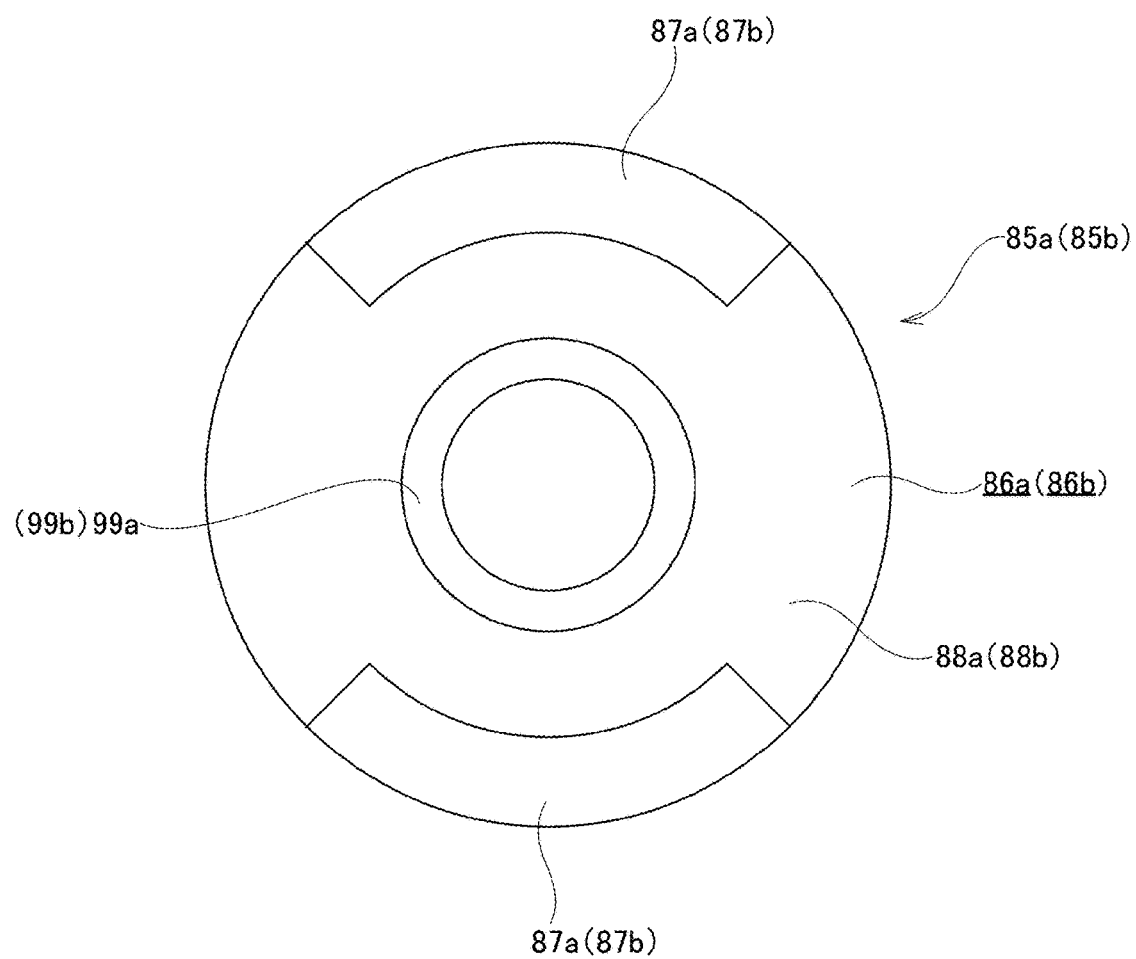
FIG. 22 is a view of a first coupling member (second coupling member) of the coupling that constitutes the power distribution mechanism according to the first example of the embodiment when viewed from an axial direction in which the first coupling member (second coupling member) is taken out.
Figure 23:
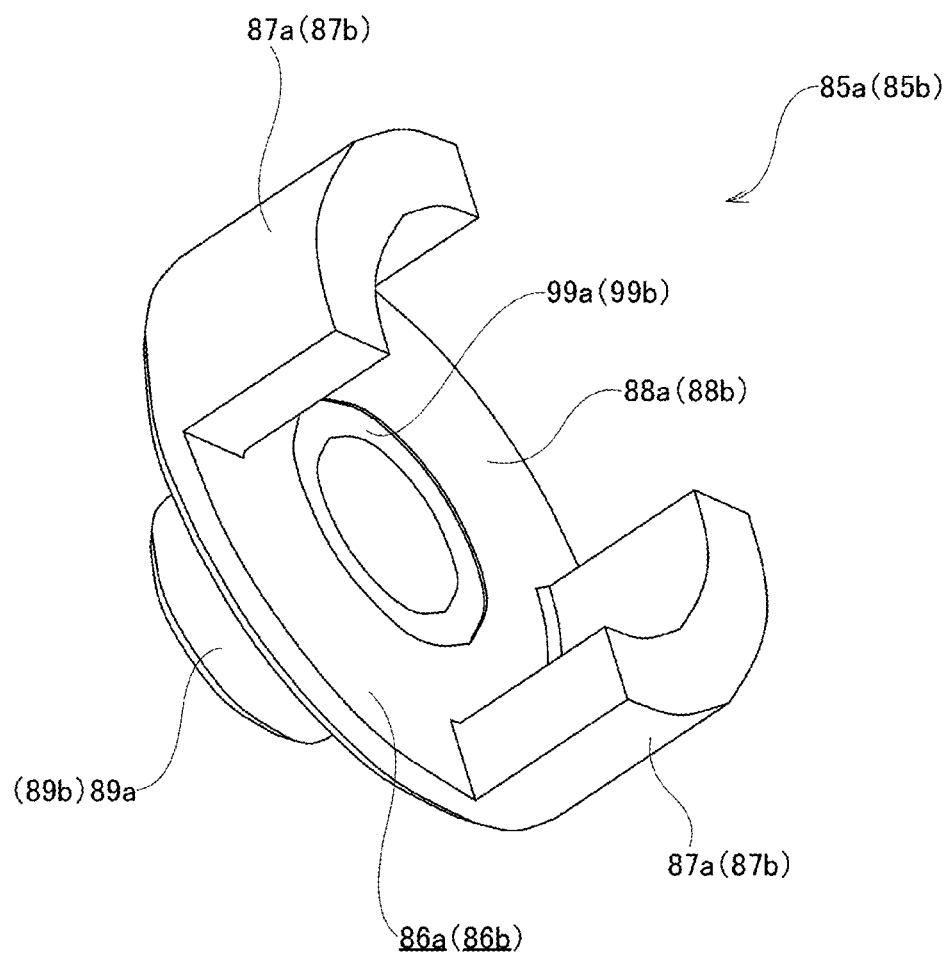
FIG. 23 is a perspective view showing the first coupling member (second coupling member) of the coupling that constitutes the power distribution mechanism according to the first example of the embodiment in which the first coupling member (second coupling member) is taken out.

The electric motor 40 is disposed inside the motor accommodating portion 48. The electric motor 40 includes a motor main body 53 and a motor shaft 54. FIG. 13 schematically shows these components (the motor main body 53 and the motor shaft 54).

The motor main body 53 includes a motor housing 55 having a cylindrical shape, and a rotor and a stator (not shown) arranged inside a motor housing 55. The rotor is supported by an axially intermediate portion of the motor shaft 54. The stator is disposed around the rotor and is supported inside the motor housing 55.

End portions of the motor shaft 54 on axially both sides protrude from the motor main body 53 toward the axially both sides. The motor shaft 54 includes a shaft-shaped first connection portion 56 connected to the speed reduction mechanism 41 on the end portion on one side in an axial direction that protrudes from the motor main body 53. Further, the motor shaft 54 includes a shaft-shaped second connection portion 57 connected to the non-excited operation type brake 42 on the end portion on the other side in the axial direction that protrudes from the motor main body 53. The electric motor 40 rotates the motor shaft 54 by a predetermined angle in a predetermined direction based on a command signal from a control device (not shown).

<Speed Reduction Mechanism>

The speed reduction mechanism 41 increases a torque (power) of the electric motor 40, and transmits the increased torque (power) to the first rotary-to-linear motion conversion mechanism 6a and the second rotary-to-linear motion conversion mechanism 6b. Therefore, the speed reduction mechanism 41 transmits rotation of the electric motor 40 to the two spindles 29a and 29b. The speed reduction mechanism 41 is accommodated inside the gear accommodating portion 49.

The speed reduction mechanism 41 includes a worm speed reduction mechanism 58, a power distribution mechanism (differential) 59, and a plurality of gears (spur gears) 60a to 60e. Among the plurality of gears 60a to 60e, the first gear 60a to the third gear 60c correspond to intermediate transmission gears described in the claims, and the fourth gear 60d and the fifth gear 60e correspond to final gears described in the claims. Further, FIG. 13 schematically shows some components (the worm speed reduction mechanism 58, the power distribution mechanism 59, and the plurality of gears 60a to 60e) of the speed reduction mechanism 41.

(Worm Speed Reducer)

The worm speed reduction mechanism 58 is connected to the first connection portion 56 of the motor shaft 54 that constitutes the electric motor 40. The worm speed reduction mechanism 58 includes a worm 61 and a worm wheel 62, and does not have a self-lock function. Therefore, the worm speed reduction mechanism 58 of the present example can not only transmit rotation of the electric motor 40 to the first rotary-to-linear motion conversion mechanism 6a and the second rotary-to-linear motion conversion mechanism 6b, but also transmit rotation reversely input from the first rotary-to-linear motion conversion mechanism 6a and the second rotary-to-linear motion conversion mechanism 6b to the motor shaft 54 of the electric motor 40.

The worm 61 includes worm teeth 63 at an axially intermediate portion of an outer peripheral surface thereof, and is disposed coaxially with the motor shaft 54 of the electric motor 40. An end portion (base end portion) of the worm 61 on the other side in the axial direction is fixed to the first connection portion 56 of the motor shaft 54 so as not to be relatively rotatable. An end portion of the worm 61 on one side in the axial direction is rotatably supported inside the gear accommodating portion 49 via a bearing (not shown). In the present example, the worm 61 corresponds to a drive gear described in the claims, and the worm wheel 62 corresponds to an intermediate transmission gear described in the claims.

The worm wheel 62 includes wheel teeth 64 on an outer peripheral surface thereof. The wheel teeth 64 mesh with the worm teeth 63 provided on the worm 61. The worm wheel 62 is externally fitted and fixed to the first intermediate shaft 65 rotatably supported inside the gear accommodating portion 49 so as not to be relatively rotatable. The first intermediate shaft 65 is disposed substantially parallel to center axes of the spindle 29a of the first rotary-to-linear motion conversion mechanism 6a and the spindle 29b of the second rotary-to-linear motion conversion mechanism 6b. Therefore, a rotation center axis of the worm wheel 62 is disposed substantially parallel to the center axes of the spindles 29a and 29b. The term "substantially parallel" means not only completely parallel but also substantially parallel.

In addition to the first intermediate shaft 65, a second intermediate shaft 66, a support shaft 67, a first output shaft 68, and a second output shaft 69 are supported inside the gear accommodating portion 49. The second intermediate shaft 66, the support shaft 67, the first output shaft 68, and the second output shaft 69 are arranged substantially parallel to the first intermediate shaft 65. The first intermediate shaft 65, the second intermediate shaft 66, the support shaft 67, the first output shaft 68, and the second output shaft 69 constitute the speed reduction mechanism 41. The support shaft 67 among the above-described components particularly constitutes the power distribution mechanism 59.

The first gear 60a is externally fitted and fixed to the first intermediate shaft 65 at a portion axially deviated from the worm wheel 62 so as not to be relatively rotatable. The first gear 60a has a smaller number of teeth than the wheel teeth 64, and meshes with the second gear 60b externally fitted and fixed to the second intermediate shaft 66 so as not to be relatively rotatable. The third gear 60c having a smaller number of teeth than the second gear 60b is externally fitted and fixed to the second intermediate shaft 66 at a portion axially deviated from the second gear 60b so as not to be relatively rotatable. The third gear 60c meshes with an input carrier 73 (described later) that constitutes the power distribution mechanism 59. Therefore, the power distribution mechanism 59 is located downstream of the worm speed reduction mechanism 58 in a power transmission direction of the electric motor 40.

The fourth gear 60d that is the final gear is externally fitted and fixed to the first output shaft 68, and the fifth gear 60e that is the final gear is externally fitted and fixed to the second output shaft 69. The fourth gear 60d meshes with a first output member 76 (described later) that constitutes the power distribution mechanism 59, and the fifth gear 60e meshes with a second output member 77 (described later) that constitutes the power distribution mechanism 59.

Engagement holes (serration holes) 70a and 70b are provided in end portions of the first output shaft 68 and the second output shaft 69 on an axially outer side, respectively. In the present example, end portions (base end portions) of the spindles 29a and 29b, which constitute the first rotary-to-linear motion conversion mechanism 6a and the second rotary-to-linear motion conversion mechanism 6b, on an axially inner side are engaged with the engagement holes 70a and 70b so as not to be relatively rotatable. Accordingly, the first output shaft 68 and the spindle 29a are coaxially connected to each other so as not to be relatively rotatable. Further, the second output shaft 69 and the spindle 29b are coaxially connected to each other so as not to be relatively rotatable. Therefore, rotation center axes of the fourth gear 60d and the fifth gear 60e that are the final gears are arranged substantially parallel to (coaxially with) center axes of the spindles 29a and 29b. When the present invention is carried out, the first output shaft and the spindle and/or the second output shaft and the spindle may be integrally formed, and the final gear may be directly connected to the spindle.

(Power Distribution Mechanism)

The power distribution mechanism 59 is disposed between the third gear 60c and the fourth gear 60d and the fifth gear 60e that are the final gears. The power distribution mechanism 59 has a function of distributing and transmitting power input from the third gear 60c to the fourth gear 60d and the fifth gear 60e.

Specifically, the power distribution mechanism 59 distributes the power corresponding to magnitudes (easiness of rotation) of rotational loads of the spindles 29a and 29b to the fourth gear 60d and the fifth gear 60e. Accordingly, regardless of a difference in efficiency between the first rotary-to-linear motion conversion mechanism 6a and the second rotary-to-linear motion conversion mechanism 6b and the like, a difference is prevented from occurring between a force by which the first piston 5a presses the inner pad 4b by the first rotary-to-linear motion conversion mechanism 6a and a force by which the second piston 5b presses the inner pad 4b by the second rotary-to-linear motion conversion mechanism 6b.

The power distribution mechanism 59 includes one support shaft 67 and a gear train 71 disposed around the support shaft 67. The power distribution mechanism 59 is supported by the housing 39 by supporting and fixing end portions of the support shaft 67 on axially both sides to the housing 39, and is disposed inside the gear accommodating portion 49. In the following description of the power distribution mechanism 59, an axial direction, a radial direction, and a circumferential direction refer to an axial direction, a radial direction, and a circumferential direction of the support shaft 67, unless otherwise specified. Further, the axial direction of the support shaft 67 coincides with the axial direction of the rotor 8.

The end portion of the support shaft 67 on an axially outer side is molded and fixed to the side wall portion 51 of the housing main body 45, which constitutes the axially inner surface of the gear accommodating portion 49. That is, the end portion of the support shaft 67 on the axially outer side is fixed to the side wall portion 51 by solidifying a molten resin or a metal that is a material of the housing main body 45. On the contrary, the end portion of the support shaft 67 on an axially inner side is fixed to the closing plate portion 46 that closes the opening portion of the gear accommodating portion 49 on the axially outer side by gap fitting with a minute gap. However, when the present invention is carried out, the end portion of the support shaft 67 on the axially outer side may be press-fitted and fixed or bonded and fixed to the side wall portion 51, and the end portion of the support shaft 67 on the axially inner side may be press-fitted and fixed, molded and fixed, or bonded and fixed to the closing plate portion 46.

In the present example, positioning of the closing plate portion 46 with respect to the housing main body 45 is achieved by using the end portion of the support shaft 67 on the axially inner side. However, when the present invention is carried out, the positioning of the closing plate portion 46 with respect to the housing main body 45 may be achieved by engagement between an opening edge portion of the gear accommodating portion 49 that constitutes the housing main body 45 and an outer peripheral edge portion of the closing plate portion 46.

The gear train 71 includes a plurality of gears (spur gears), is unitized (sub-assembled), and can be handled as a component. The gear train 71 includes a through hole 72 through which the support shaft 67 can be inserted. The gear train 71 is attached to a periphery of the support shaft 67 by inserting the support shaft 67 into the through hole 72.

The gear train 71 includes the input carrier 73, first intermediate gears 74, second intermediate gears 75, the first output member 76, and the second output member 77. The input carrier 73, the first output member 76, and the second output member 77 are also gears including teeth portions on their outer peripheral surfaces.

The input carrier 73 includes a pair of support rings 78a and 78b each having an annular shape, and a plurality of (six in total in the shown example) pins 79a and 79b bridged between the pair of support rings 78a and 78b. The pair of support rings 78a and 78b are coupled to each other by the plurality of pins 79a and 79b. The support ring 78a between the support rings 78a and 78b includes a teeth portion 73a that meshes with the third gear 60c on an outer peripheral surface, and the second output member 77 is inserted therein so as to be relatively rotatable. The first output member 76 is inserted into the support ring 78b between the support rings 78a and 78b so as to be relatively rotatable. The pins 79a and 79b are arranged parallel to the support shaft 67. As will be described later, since the support shaft 67 is inserted into the first output member 76 and the second output member 77, the input carrier 73 is rotatably supported around the support shaft 67 via the first output member 76 and the second output member 77.

The first intermediate gears 74 and the second intermediate gears 75 are rotatably supported by the input carrier 73. Specifically, the first intermediate gear 74 and the second intermediate gear 75 are rotatably supported around the pins 79a and 79b, and are arranged on a portion between the pair of support rings 78a and 78b. The first intermediate gear 74 includes a teeth portion around a portion of the pin 79a closer to an axially inner side, whereas the second intermediate gear 75 includes a teeth portion around a portion of the pin 79b closer to an axially outer side. The first intermediate gear 74 and the second intermediate gear 75 mesh with each other.

The first output member 76 and the second output member 77 are arranged coaxially with each other in a state of being separated in the axial direction. The first output member 76 is rotatably supported around an axially inner portion of the support shaft 67, and the second output member 77 is rotatably supported around an axially outer portion of the support shaft 67.

The first output member 76 is formed in a hollow tubular shape, and includes an insertion hole 80a through which the support shaft 67 can be inserted. The insertion hole 80a constitutes a part of a through hole 72, and a bush 81a is fitted into an opening portion of the insertion hole 80a on an axially inner side. The first output member 76 includes an outward flange-shaped flange portion 82a on an end portion on an axially outer side. An input teeth portion 76a is formed on an outer peripheral surface of the flange portion 82a. An output teeth portion 76b is formed on an outer peripheral surface of a portion of the first output member 76 that protrudes axially inward with respect to the support ring 78b. The input teeth portion 76a meshes with the first intermediate gear 74. On the contrary, the output teeth portion 76b meshes with the fourth gear 60d. Therefore, rotation of the first output member 76 is transmitted to the first output shaft 68 through a meshing portion between the output teeth portion 76b and the fourth gear 60d.

The second output member 77 is formed in a hollow tubular shape, and includes an insertion hole 80b through which the support shaft 67 can be inserted. The insertion hole 80b constitutes a part of the through hole 72, and a bush 81b is fitted into an opening portion of the insertion hole 80b on an axially outer side. The second output member 77 includes an outward flange-shaped flange portion 82b on an end portion on the axially inner side. An input teeth portion 77a is formed on an outer peripheral surface of the flange portion 82b. An output teeth portion 77b is formed on an outer peripheral surface of a portion of the second output member 77 that protrudes axially outward with respect to the support ring 78a. The input teeth portion 77a meshes with the second intermediate gear 75. On the contrary, the output teeth portion 77b meshes with the fifth gear 60e. Therefore, rotation of the second output member 77 is transmitted to the second output shaft 69 through a meshing portion between the output teeth portion 77b and the fifth gear 60e.

The first output member 76 is prevented from coming out from the support ring 78b axially inward by engaging the flange portion 82a from the axially outer side with an inner peripheral edge portion of the support ring 78b that constitutes the input carrier 73. On the contrary, the second output member 77 is prevented from coming out from the support ring 78a axially outward by engaging the flange portion 82b from the axially inner side with an inner peripheral edge portion of the support ring 78a that constitutes the input carrier 73. Accordingly, in a state where the gear train 71 is assembled, the first output member 76 and the second output member 77 are prevented from falling off, and can be handled as one component.

The power distribution mechanism 59 of the present example further includes a biasing member 83 in order to prevent the first output member 76 and the second output member 77 from relatively rotating when a braking force by a parking brake is released (during reduced pressure differential).

The biasing member 83 is a coil spring made of a metal wire, and is disposed between the first output member 76 and the second output member 77 in the axial direction in a compressed and deformed state. The support shaft 67 is inserted through the biasing member 83. The biasing member 83 biases the first output member 76 and the second output member 77 in opposite directions in the axial direction. In other words, the biasing member 83 is stretched between the first output member 76 and the second output member 77. Accordingly, the biasing member 83 prevents relative rotation between the first output member 76 and the second output member 77 unless a torque of a predetermined magnitude or more is applied to the first output member 76 and the second output member 77.

A magnitude of a biasing force (load) applied to the first output member 76 and the second output member 77 by the biasing member 83 is set to such a magnitude that the relative rotation between the first output member 76 and the second output member 77 cannot be hindered by the torque applied to the first output member 76 and the second output member 77 when the parking brake is operated, and the relative rotation between the first output member 76 and the second output member 77 can be prevented by the torque applied to the first output member 76 and the second output member 77 when the braking force by the parking brake is released. In this way, a reason why a possibility of the relative rotation between the first output member 76 and the second output member 77 changes when the parking brake is operated and when the braking force by the parking brake is released is as follows. That is, when the parking brake is operated, the torque applied to the first output member 76 and the second output member 77 is sufficiently larger than that in the case where the braking force by the parking brake is released, and therefore, the relative rotation between the first output member 76 and the second output member 77 cannot be hindered by the biasing force of the biasing member 83. On the contrary, when the braking force by the parking brake is released, the torque is reduced to a certain extent, and the torque applied to the first output member 76 and the second output member 77 becomes small, and therefore, the biasing force of the biasing member 83 can prevent the relative rotation between the first output member 76 and the second output member 77. The biasing member 83 is mounted on the gear train 71 together with a coupling 84 described later, and can be handled as one component.

The power distribution mechanism 59 of the present example further includes the coupling 84 in order to maintain a posture of the biasing member 83 and to prevent local wear from occurring in the first output member 76 and the second output member 77 due to sliding contact with the biasing member 83.

The coupling 84 is disposed between the first output member 76 and the second output member 77 in the axial direction, and supports the biasing member 83 from the axially both sides. The coupling 84 includes a first coupling member 85a and a second coupling member 85b.

In the present example, the first coupling member 85a and the second coupling member 85b are components (common components) having the same shape and the same size. However, when the present invention is carried out, the first coupling member and the second coupling member may be components having shapes and sizes different from each other.

The first coupling member 85a is made of, for example, a sintered metal, is supported so as to be relatively rotatable around a center axis of the support shaft 67 with respect to the first output member 76, and is in contact with an end portion of the biasing member 83 on the axially inner side. The first coupling member 85a includes a first base portion 86a, and a plurality of (two in the shown example) first engagement protrusions 87a.

The first base portion 86a includes an annular base plate portion 88a, and an insertion tubular portion 89a that protrudes axially from an inner peripheral edge portion of an axially inner surface of the base plate portion 88a. The insertion tubular portion 89a is loosely inserted into an axially outer portion of the insertion hole 80a provided in the first output member 76, and the axially inner surface of the base plate portion 88a is additionally provided on an axially outer surface of the first output member 76, so that the first base portion 86a is supported so as to be relatively rotatable around the center axis of the support shaft 67 with respect to the first output member 76.

The first engagement protrusion 87a protrudes axially from an outer peripheral edge portion of an axially outer surface of the base plate portion 88a that constitutes the first base portion 86a. The first engagement protrusions 87a have a partially cylindrical shape, and are arranged at equal intervals in a circumferential direction. In the present example, since two first engagement protrusions 87a are provided, the two first engagement protrusions 87a are arranged on opposite sides of the base plate portion 88a in a diameter direction. The first engagement protrusion 87a has an inner diameter slightly larger than an outer diameter of the biasing member 83. A circular-ring-shaped recessed groove 99a is provided in the axially outer surface of the base plate portion 88a.

The second coupling member 85b is made of, for example, a sintered metal, is supported so as to be relatively rotatable around the center axis of the support shaft 67 with respect to the second output member 77, and is in contact with an end portion of the biasing member 83 on the axially outer side. The second coupling member 85b includes a second base portion 86b, and a plurality of (two in the shown example) second engagement protrusions 87b.

The second base portion 86b includes an annular base plate portion 88b, and an insertion tubular portion 89b that protrudes axially from an inner peripheral edge portion of an axially outer surface of the base plate portion 88b. The insertion tubular portion 89b is loosely inserted into an axially inner portion of the insertion hole 80b provided in the second output member 77, and the axially outer surface of the base plate portion 88b is additionally provided on an axially inner surface of the second output member 77, so that the second base portion 86b is supported so as to be relatively rotatable around the center axis of the support shaft 67 with respect to the second output member 77.

The second engagement protrusion 87b protrudes axially from an outer peripheral edge portion of an axially inner surface of the base plate portion 88b that constitutes the second base portion 86b. The second engagement protrusions 87b have a partially cylindrical shape, and are arranged at equal intervals in the circumferential direction. In the present example, since two second engagement protrusions 87b are provided, the two second engagement protrusions 87b are arranged on opposite sides of the base plate portion 88b in a diameter direction. The second engagement protrusion 87b has an inner diameter slightly larger than the outer diameter of the biasing member 83. A circular-ring-shaped recessed groove 99b is provided in the axially inner surface of the base plate portion 88b.

Figure 24:
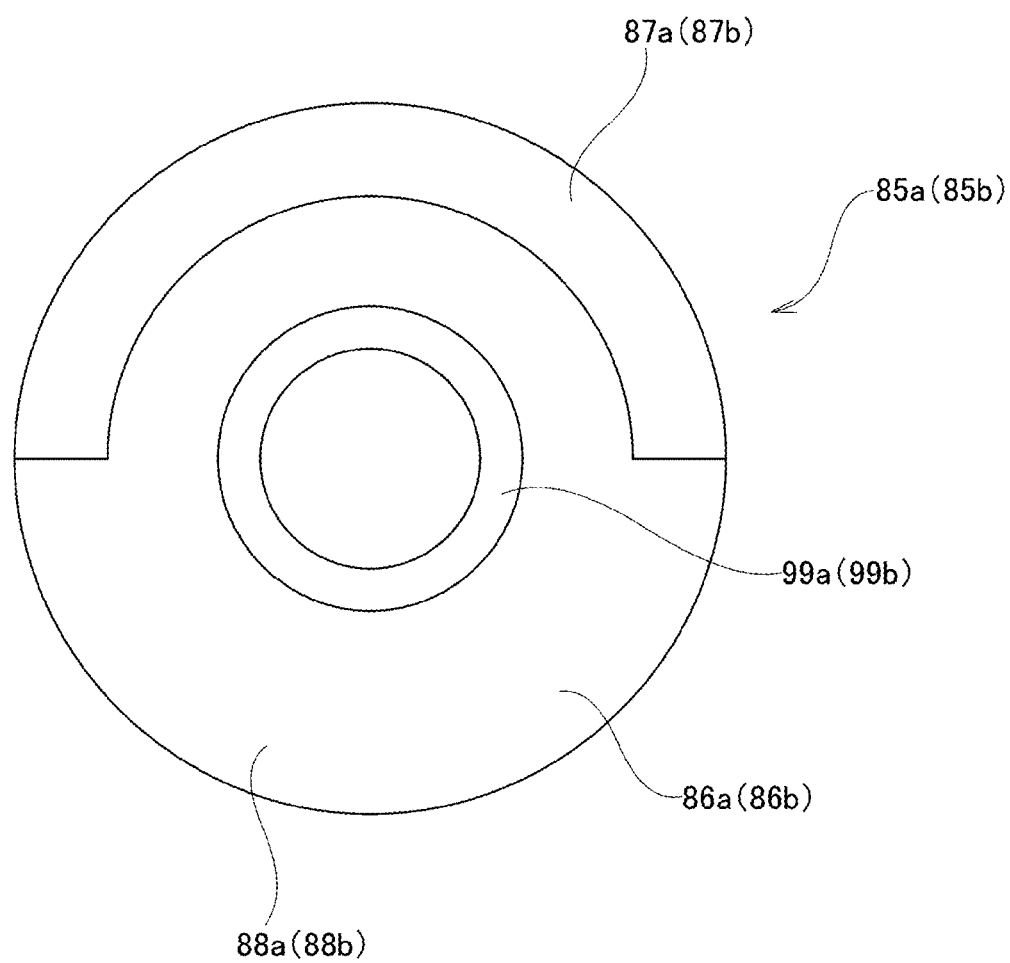
FIG. 24 is a view of a first coupling member (second coupling member) according to an example of a modified example when viewed from an axial direction in which the first coupling member (second coupling member) is taken out.
Figure 25:
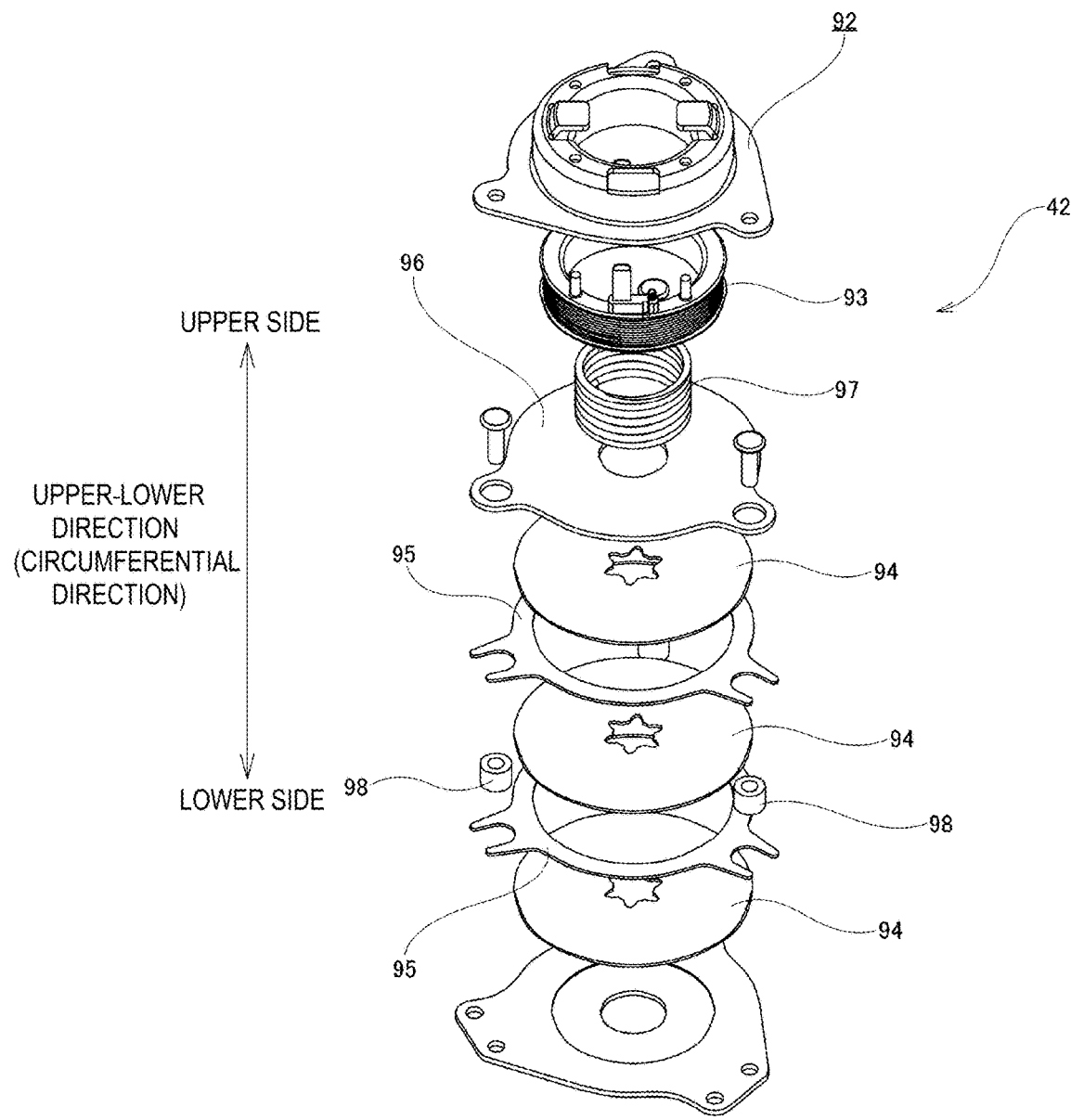
FIG. 25 is an exploded perspective view of a non-excited operation type brake that constitutes the motor gear unit according to the first example of the embodiment.
Figure 26:
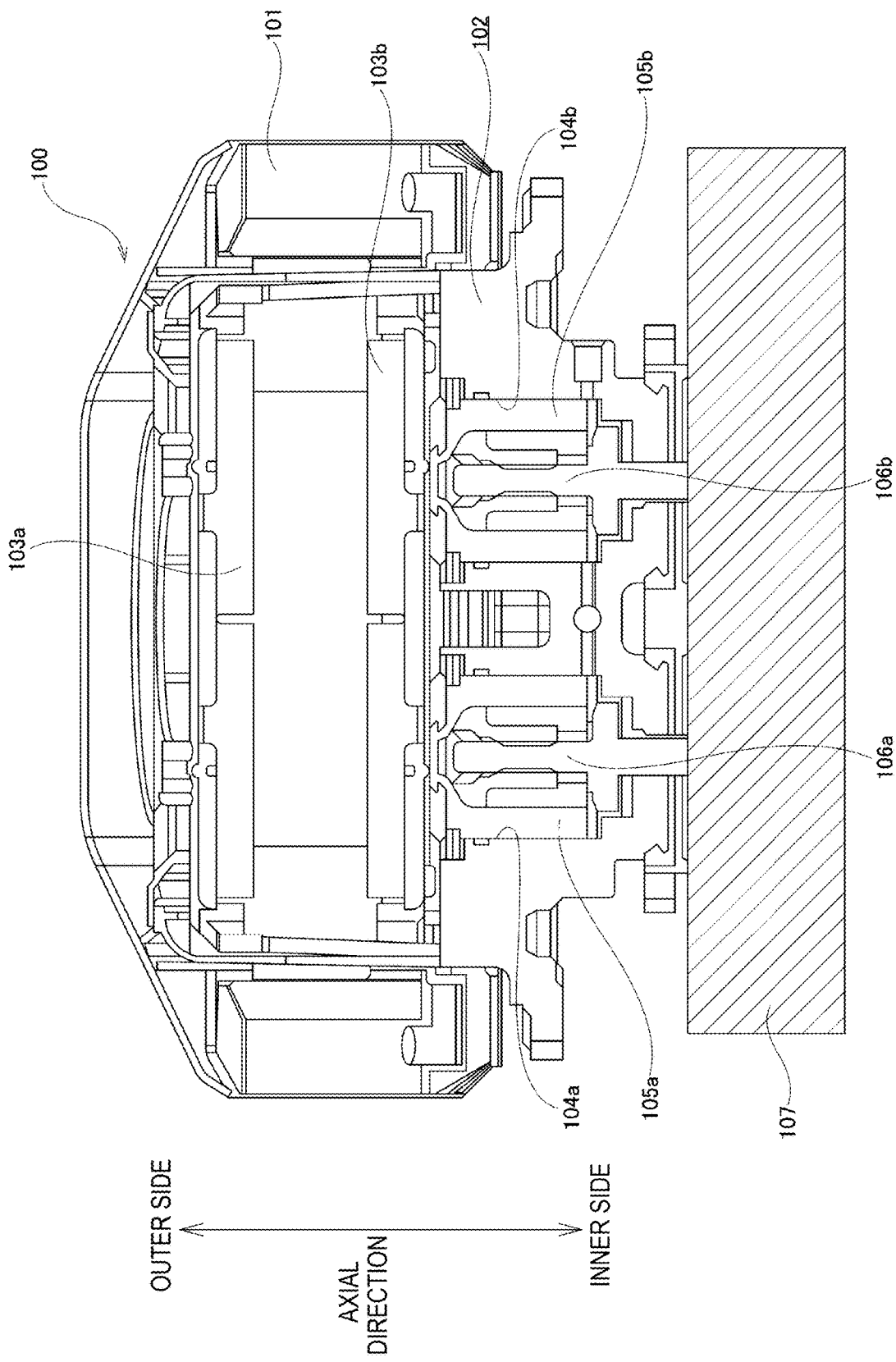
FIG. 26 is a cross-sectional view showing a disc brake apparatus having a related-art structure.
Figure 27:
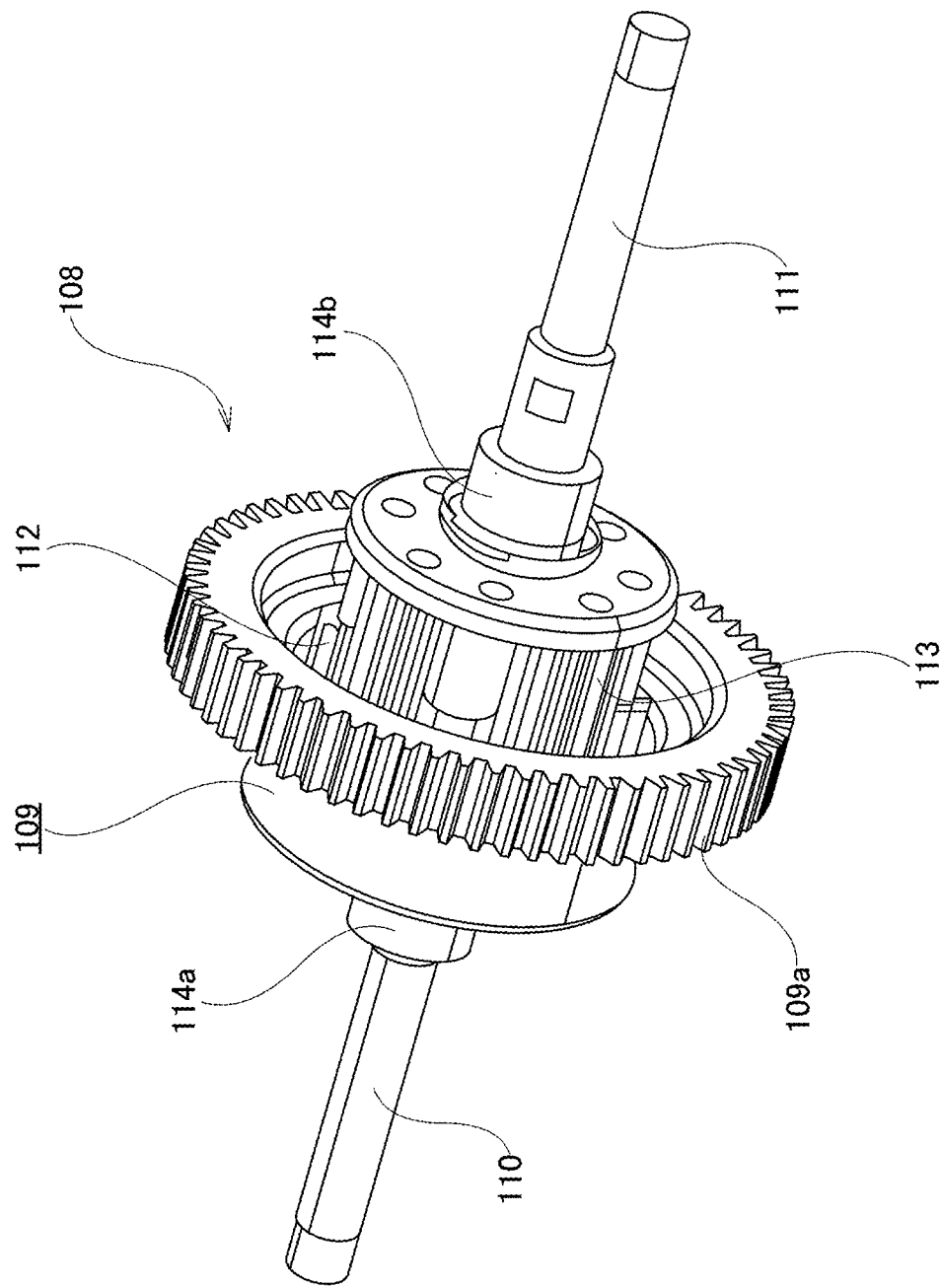
FIG. 27 is a perspective view showing a power distribution mechanism that constitutes the disc brake apparatus having the related-art structure in which the power distribution mechanism is taken out.

In the present example, the coupling 84 is formed by combining the first coupling member 85a and the second coupling member 85b with their phases in the circumferential direction shifted by 90 degrees. Therefore, the first engagement protrusions 87a and the second engagement protrusions 87b are alternately arranged in the circumferential direction, and are engaged with each other in the circumferential direction. Therefore, the first coupling member 85a and the second coupling member 85b are engaged with each other so as not to be relatively rotatable around the center axis of the support shaft 67, and so as to be relatively displaceable in the axial direction. In the present example, the plurality of first engagement protrusions 87a and the plurality of second engagement protrusions 87b are provided, but as shown in FIG. 24, the first coupling member 85a (second coupling member 85b) including one first engagement protrusion 87a (second engagement protrusion 87b) having a semi-cylindrical shape may be used.

In a state where the first coupling member 85a and the second coupling member 85b are combined and the biasing member 83 is elastically deformed, gaps 90a and 90b are respectively provided at a portion between an axially tip end surface of the first engagement protrusion 87a and the axially inner surface of the base plate portion 88b that constitutes the second base portion 86b, and a portion between an axially tip end surface of the second engagement protrusion 87b and the axially outer surface of the base plate portion 88a that constitutes the first base portion 86a.

In a state where the first coupling member 85a and the second coupling member 85b are combined, the biasing member 83 is elastically sandwiched between the axially outer surface of the base plate portion 88a that constitutes the first base portion 86a and the axially inner surface of the base plate portion 88b that constitutes the second base portion 86b. Accordingly, the biasing member 83 biases the first output member 76 and the second output member 77 via the first coupling member 85a and the second coupling member 85b.

Therefore, when the first output member 76 and the second output member 77 are relatively rotated, the relative rotation occurs between the first output member 76 and the first coupling member 85a and/or between the second output member 77 and the second coupling member 85b, and the relative rotation does not occur between the first coupling member 85a and the second coupling member 85b. Therefore, occurring of local wear can be prevented between the biasing member 83 and the first coupling member 85a and between the biasing member 83 and the second coupling member 85b. Further, since the biasing member 83 is guided from a radially outer side by the first engagement protrusions 87a and the second engagement protrusions 87b, deterioration of a posture of the biasing member 83 can be prevented.

When assembling the gear train 71, the biasing member 83 and the coupling 84 of the present example can be mounted in advance between the first output member 76 and the second output member 77. Therefore, during assembling work of the motor gear unit 7, the power distribution mechanism 59 can be assembled inside the gear accommodating portion 49 only by performing work of inserting the support shaft 67 through the through hole 72 of the gear train 71 on which the biasing member 83 and the coupling 84 are mounted.

In the power distribution mechanism 63 of the present example, when the braking force by the parking brake is obtained (during a pressurization differential), the input carrier 73 is rotated (rotated on its own axis) around the support shaft 67, so that the first intermediate gears 74 and the second intermediate gears 75 are caused to revolve.

Then, when magnitudes of rotational loads of the first output member 76 and the second output member 77, that is, magnitudes (easiness of rotation) of rotational loads of the spindles 29a and 29b are the same as each other, In a state of meshing with each other, the first intermediate gear 74 and the second intermediate gear 75 are only revolved without being rotated on their own axes, and transmit rotation to the first output member 76 and the second output member 77. Therefore, both the first output member 76 that meshes with the first intermediate gear 74 and the second output member 77 that meshes with the second intermediate gear 75 are rotated in the same direction at the same speed. The case where the magnitudes of the rotational loads of the spindles 29a and 29b are the same as each other refers to, for example, a state where the spindles 29a and 29b are rotated under no load while tip end portions of the nuts 30a and 30b do not press the first piston 5a and the second piston 5b, a minute pressurized state where the tip end portions of the nuts 30a and 30b start to press the first piston 5a and the second piston 5b, or the like.

On the contrary, when the magnitudes of the rotational loads of the first output member 76 and the second output member 77, that is, the magnitudes of the rotational loads of the spindles 29a and 29b are different from each other, in a state of meshing with each other, the first intermediate gear 74 and the second intermediate gear 75 are not only revolved but also rotated on their own axes, and transmit rotation to one or both of the first output member 76 and the second output member 77. A case where the magnitudes of the rotational loads of the spindles 29a and 29b are different from each other occurs when the first piston 5a and the second piston 5b do not simultaneously press the inner pad 4b, and a timing at which the first piston 5a and the second piston 5b press the inner pad 4b is shifted due to a difference in efficiency between the first rotary-to-linear motion conversion mechanism 6a and the second rotary-to-linear motion conversion mechanism 6b or the like.

For example, when the first piston 5a presses the inner pad 4b prior to the second piston 5b, a rotational load of the spindle 29a that constitutes the first rotary-to-linear motion conversion mechanism 6a is larger than a rotational load of the spindle 29b that constitutes the second rotary-to-linear motion conversion mechanism 6b. In this case, the power distribution mechanism 59 distributes and transmits the rotation of the input carrier 73 to the first output member 76 and the second output member 77 such that a rotation speed of the first output member 76 is lower than a rotation speed of the second output member 77. Conversely, when the second piston 5b presses the inner pad 4b prior to the first piston 5a, the rotational load of the spindle 29a that constitutes the first rotary-to-linear motion conversion mechanism 6a is smaller than the rotational load of the spindle 29b that constitutes the second rotary-to-linear motion conversion mechanism 6b. In this case, the power distribution mechanism 59 distributes and transmits the rotation of the input carrier 73 to the first output member 76 and the second output member 77 such that the rotation speed of the first output member 76 is higher than the rotation speed of the second output member 77.

On the contrary, in the power distribution mechanism 59 of the present example, when the braking force by the parking brake is released (during a reduced pressure differential), an action of the biasing member 83 can prevent the relative rotation between the first output member 76 and the second output member 77, and can simultaneously rotate both the first output member 76 and the second output member 77 in a direction opposite to that during a pressurization operation. Therefore, both a pressing force on the inner pad 4b by the first piston 5a and a pressing force on the inner pad 4b by the second piston 5b can be reduced to zero.

<Non-Excited Operation Type Brake>

Figure 11:
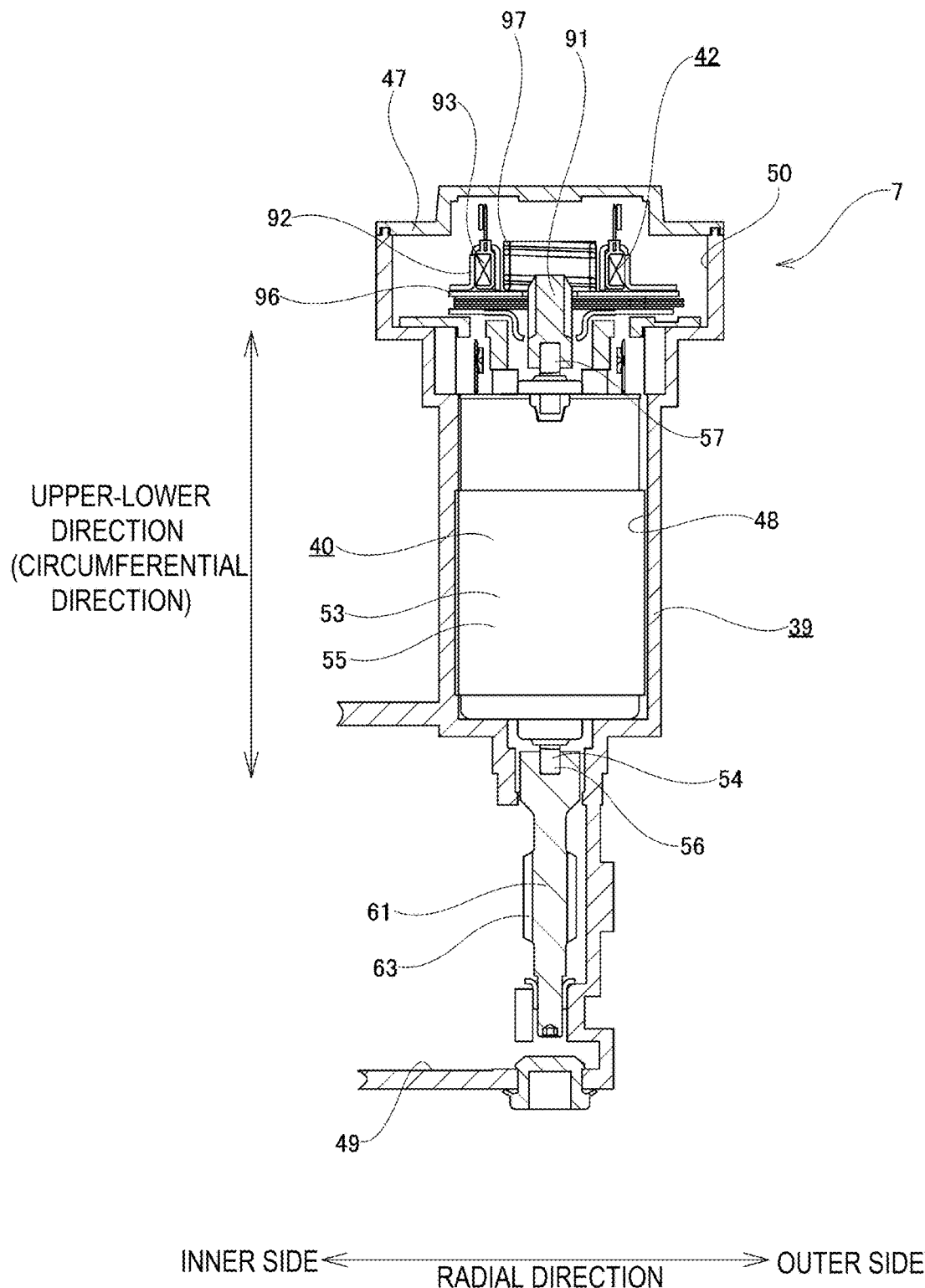
FIG. 11 is a partial cross-sectional view of the motor gear unit according to the first example of the embodiment.
Figure 12:
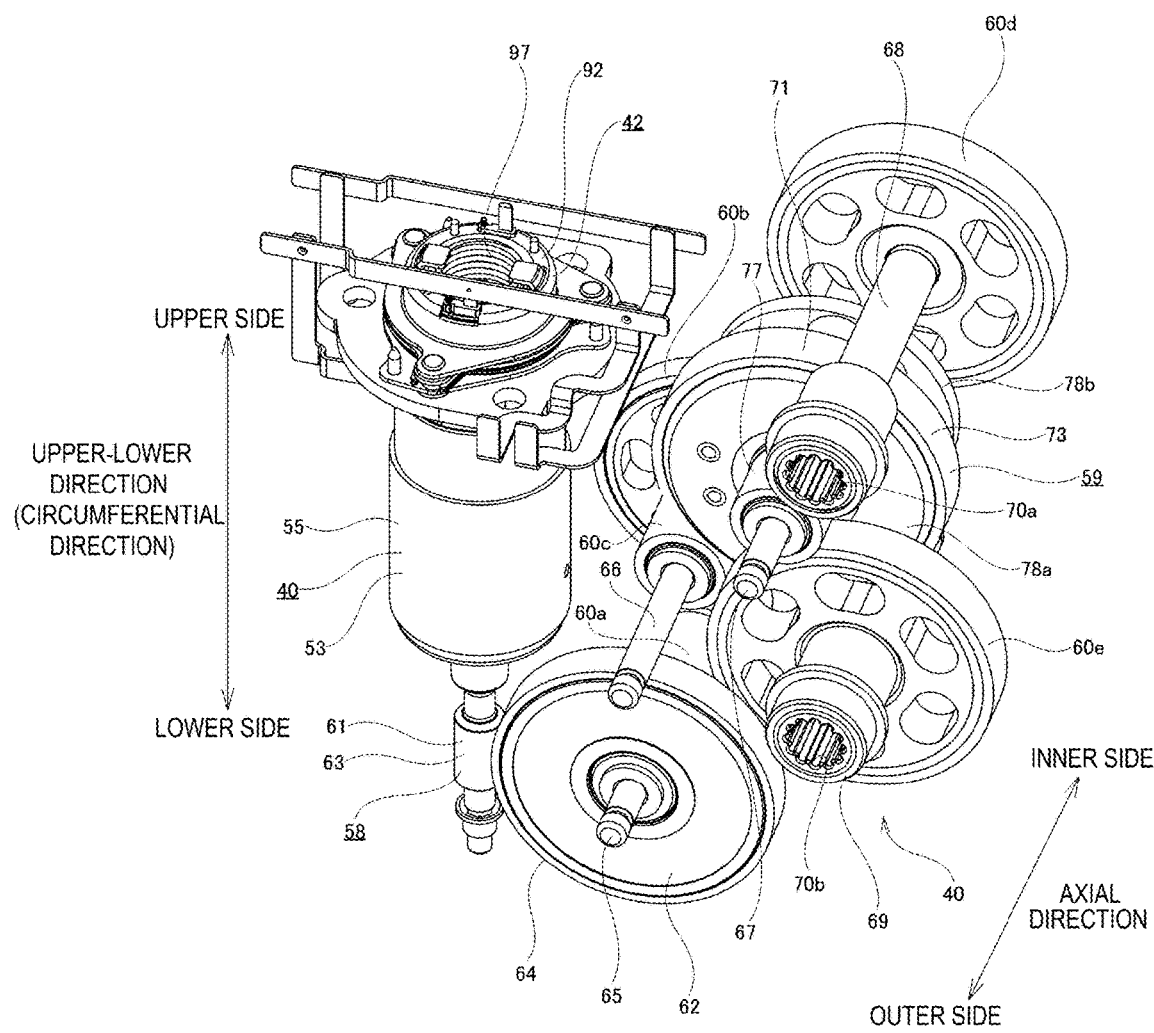
FIG. 12 is a perspective view showing the motor gear unit according to the first example of the embodiment in which a housing is omitted.

As shown in FIG. 11, the non-excited operation type brake 42 is connected to the second connection portion 57 of the motor shaft 54 that constitutes the electric motor 40. Specifically, the non-excited operation type brake 42 is connected to the second connection portion 57 via a connection shaft 91. The connection shaft 91 is connected to the second connection portion 57 so as not to be relatively rotatable. The non-excited operation type brake 42 is a friction brake, and has a function of allowing rotation of the motor shaft 54 during energization and preventing the rotation of the motor shaft 54 during non-energization.

The non-excited operation type brake 42 includes a casing 92, an electromagnetic coil 93, a plurality of (three in the shown example) rotation-side discs 94, a plurality of (two in the shown example) stationary-side discs 95, a pressing plate (armature) 96, a pressing spring 97, and a plurality of (three in the shown example) spacers 98.

The electromagnetic coil 93 is formed in an annular shape, and is disposed inside the casing 92 made of a magnetic metal.

The rotation-side discs 94 and the stationary-side discs 95 are each formed in a circular ring shape, and are alternately arranged in an axial direction of the motor shaft 54 of the electric motor 40.

The rotation-side discs 94 are engaged with the connection shaft 91 fixed to the second connection portion 57 of the motor shaft 54 so as to be relatively displaceable in the axial direction of the motor shaft 54 and so as not to be relatively displaceable in a circumferential direction of the motor shaft 54.

On the contrary, the stationary-side disc 95 is supported by the casing 92 so as to be relatively displaceable in the axial direction of the motor shaft 54 and so as not to be relatively displaceable in the circumferential direction of the motor shaft 54.

The pressing plate 96 is made of a magnetic metal, and is formed in an annular shape as a whole. The pressing plate 96 is disposed between the electromagnetic coil 93 and a disc (the rotation-side disc 94 in the shown example) disposed closest to an electromagnetic coil 93 side among the rotation-side discs 94 and the stationary-side discs 95. Similar to the stationary-side disc 95, the pressing plate 96 is supported by the casing 92 so as to be relatively displaceable in the axial direction of the motor shaft 54 and so as not to be relatively displaceable in the circumferential direction of the motor shaft 54.

The pressing spring 97 is disposed between the pressing plate 96 and the casing 92 in an elastically deformed state. The pressing spring 97 elastically presses the pressing plate 96 in a direction away from the electromagnetic coil 93.

The spacer 98 is engaged with the pressing plate 96 and the stationary-side disc 95, and prevents rotation of the pressing plate 96 and the stationary-side disc 95.

In the non-excited operation type brake 42 of the present example, when the electromagnetic coil 93 is energized, a magnetic circuit is formed in the casing 92 and the pressing plate 96 arranged around the electromagnetic coil 93. Accordingly, the pressing plate 96 elastically compresses and deforms the pressing spring 97. Therefore, the rotation-side disc 94 and the stationary-side disc 95 are not strongly pressed against each other by the pressing plate 96. Therefore, the rotation of the motor shaft 54 is allowed.

On the contrary, during a non-energization period during which energization to the electromagnetic coil 93 is stopped, no magnetic circuit like one formed during an energization period is formed in the casing 92 and the pressing plate 96. Therefore, the rotation-side disc 94 and the stationary-side disc 95 are pressed against each other via the pressing plate 96 by the pressing spring 97. Accordingly, the rotation-side disc 94 and the stationary-side disc 95 are friction-engaged by strongly pressing against each other. As a result, the rotation of the motor shaft 54 is prevented.

[Description of Operation of Disc Brake Apparatus]

When the service brake is operated by the disc brake apparatus 1 of the present example, the brake oil is fed to the first cylinder 20a and the second cylinder 20b provided in the caliper 3 through an oil passage (not shown). Accordingly, the first piston 5a and the second piston 5b are pushed out from the first cylinder 20a and the second cylinder 20b, and the inner pad 4b is pressed against an axially inner surface of the rotor 8. Further, the caliper 3 is displaced axially inward with respect to the support 2 by a reaction force caused by the pressing. Then, the outer pad 4a is pressed against an axially outer surface of the rotor 8 by the pressing portion 15 of the caliper 3. Accordingly, a braking force is obtained by friction that acts on contact surfaces between the pair of pads 4a and 4b and the rotor 8. In this way, the disc brake apparatus 1 obtains the braking force by the service brake by pushing out the first piston 5a and the second piston 5b by introducing the brake oil.

When the parking brake is operated by the disc brake apparatus 1, the electric motor 40 that constitutes the motor gear unit 7 is energized, and the spindle 29a that constitutes the first rotary-to-linear motion conversion mechanism 6a and the spindle 29b that constitutes the second rotary-to-linear motion conversion mechanism 6b are rotationally driven in the forward rotation direction via the speed reduction mechanism 41. Accordingly, the nuts 30a and 30b are moved axially outward. Then, since the first piston 5a and the second piston 5b are pushed out toward the rotor 8, the inner pad 4b is pressed against the axially inner surface of the rotor 8. Further, the caliper 3 is displaced axially inward with respect to the support 2 by the reaction force caused by the pressing. Then, the outer pad 4a is pressed against the axially outer surface of the rotor 8 by the pressing portion 15 of the caliper 3. Accordingly, the braking force is obtained by the friction that acts on the contact surfaces between the pair of pads 4a and 4b and the rotor 8. In this way, the disc brake apparatus 1 obtains the braking force by the parking brake by pushing out the first piston 5a and the second piston 5b by using the motor gear unit 7.

During a non-energization period during which an engine of an automobile is stopped and energization to the electric motor 40 is stopped, energization to the electromagnetic coil 93 that constitutes the non-excited operation type brake 42 is also stopped. Therefore, the rotation of the motor shaft 54 can be prevented by the non-excited operation type brake 42. Therefore, the disc brake apparatus 1 of the present example can maintain the braking force by the parking brake even in a state where energization to the electric motor 40 is stopped.

According to the disc brake apparatus 1 of the present example as described above, coaxiality between the first output member 76 and the second output member 77 that constitute the power distribution mechanism 59 can be improved.

That is, in the disc brake apparatus 1 of the present example, the power distribution mechanism 59 is supported by and fixed to the housing main body 45 by using one support shaft 67, and the first output member 76 and the second output member 77 are rotatably supported around the support shaft 67. Therefore, the coaxiality between the first output member 76 and the second output member 77 can be improved as compared with a related-art structure disclosed in US Patent Application Publication No. 2020/309214 specification. Therefore, it is possible to appropriately maintain meshing between the teeth portions that constitute the power distribution mechanism 59, and to improve operability of the power distribution mechanism 59. Further, an abnormal sound can be prevented.

During the assembling work of the motor gear unit 7, the power distribution mechanism 59 can be assembled inside the gear accommodating portion 49 only by performing the work of inserting the support shaft 67 through the through hole 72 of the gear train 71 on which the biasing member 83 and the coupling 84 are mounted. Therefore, the assembling work of the power distribution mechanism 59 can be simplified and facilitated.

Since the gear train 71 that constitutes the power distribution mechanism 59 only includes the spur gears, a dimension in the axial direction can be made compact.

Since the end portion of the support shaft 67 on the axially outer side is molded and fixed to the side wall portion 51 that constitutes the housing main body 45, an installation position of the gear train 71 of the gear accommodating portion 49 can be strictly restricted. Therefore, a center-to-center distance between the power distribution mechanism 59 and each of the third gear 60c, the fourth gear 60d, and the fifth gear 65e can be stabilized, that is, a variation in the center-to-center distance can be suppressed to be small. Therefore, a mechanical efficiency of the speed reduction mechanism 41 can be improved.

It is possible to position the closing plate portion 46 with respect to the housing main body 45 by using the end portion of the support shaft 67 on the axially inner side. Therefore, as compared with a case where the end portion of the support shaft on the axially inner side is positioned with reference to the closing plate unlike the present example, a position of the end portion of the support shaft 67 on the axially inner side can be restricted at an appropriate position. Therefore, also from this perspective, the coaxiality between the first output member 76 and the second output member 77 can be improved, and the meshing between the teeth portions that constitute the power distribution mechanism 59 can be appropriately maintained.

In the present example, the biasing member 83 is sandwiched between the first output member 76 and the second output member 77, so that the relative rotation between the first output member 76 and the second output member 77 can be prevented when the braking force by the parking brake is released. Therefore, as compared with a case where one-way clutches are used as in the related-art structure disclosed in US Patent Application Publication No. 2020/309214 specification, a cost can be reduced.

When the biasing member 83 is used, in a case where the posture thereof deteriorates, a desired biasing force may not be applied to the first output member 76 and the second output member 77, and the relative rotation between the first output member 76 and the second output member 77 may not be prevented. However, in the present example, since the coupling 84 is provided, the deterioration of the posture of the biasing member 83 can be prevented. Specifically, since the first engagement protrusions 87a and the second engagement protrusions 87b respectively provided in the first coupling member 85a and the second coupling member 85b can guide the biasing member 83 from the radially outer side, a posture change of the biasing member 83 can be prevented. Therefore, the desired biasing force can be applied to the first output member 76 and the second output member 77, and the relative rotation between the first output member 76 and the second output member 77 can be prevented during a pressure reduction operation.

In a state where the first coupling member 85a and the second coupling member 85b are combined with each other, since the biasing member 83 is elastically sandwiched between the axially outer surface of the base plate portion 88a that constitutes the first base portion 86a and the axially inner surface of the base plate portion 88b that constitutes the second base portion 86b, the local wear can be prevented from occurring at the first output member 76 and the second output member 77.

Further, when the first output member 76 and the second output member 77 are relatively rotated, the relative rotation is generated between the first output member 76 and the first coupling member 85a and/or between the second output member 77 and the second coupling member 85b, and the relative rotation is not generated between the first coupling member 85a and the second coupling member 85b. Therefore, also from this perspective, since the posture change of the biasing member 83 can be prevented, the biasing member 83 can apply the desired biasing force to the first output member 76 and the second output member 77. Further, it is also possible to prevent the local wear from occurring between the biasing member 83 and the first coupling member 85a and between the biasing member 83 and the second coupling member 85b.

Since the gaps 90a and 90b are respectively provided at the portion between the axially tip end surface of the first engagement protrusion 87a and the axially inner surface of the base plate portion 88b that constitutes the second base portion 86b, and the portion between the axially tip end surface of the second engagement protrusion 87b and the axially outer surface of the base plate portion 88a that constitutes the first base portion 86a in a state where the first coupling member 85a and the second coupling member 85b are combined and the biasing member 83 is elastically deformed, the relative displacement between the first output member 76 and the second output member 77 in the axial direction can be absorbed.

Further, in the present example, since the first coupling member 85a and the second coupling member 85b are the same components having the same shape and the same size, a cost can be reduced by sharing the components, and the number of work steps of the assembling work can be reduced.

Rotation center axes of all the gears other than the worm 61 accommodated in the gear accommodating portion 49, that is, the worm wheel 62, the gears 60a to 60e, and the gear train 71 are arranged substantially parallel to the center axes of the spindles 29a and 29b. Therefore, workability of work of incorporating the speed reduction mechanism 41 inside the gear accommodating portion 49 can be improved.

In the present example, the worm speed reduction mechanism 58 that does not have the self-lock function is used instead of including the non-excited operation type brake 42. Therefore, as compared with a case where a worm speed reduction mechanism having the self-lock function is used, a frictional resistance (energy loss) can be prevented, and input/output characteristics can be improved.

Since rotation of the electric motor 40 is transmitted to the power distribution mechanism 59 via the worm speed reduction mechanism 58, as compared with a case where a structure in which the rotation is transmitted to a pair of worm speed reduction mechanisms from a power distribution mechanism is adopted, a difference between a torque transmitted to the spindle 29a that constitutes the first rotary-to-linear motion conversion mechanism 6a and a torque transmitted to the spindle 29b that constitutes the second rotary-to-linear motion conversion mechanism 6b can be reduced.

According to the present invention, it is possible to implement a motor gear unit for a disc brake apparatus and the disc brake apparatus that can improve coaxiality between a first output member and a second output member.

Although the embodiment of the present invention has been described above, the present invention is not limited thereto, and can be appropriately changed without departing from the technical idea of the invention.

The present invention is not limited to the structure described in the embodiment. For example, the biasing member is not limited to the coil spring, and other springs such as a plate spring and a disc spring may be used, or an elastic member such as rubber or synthetic resin may be used. Further, the structures of the first coupling member and the second coupling member that constitute the coupling are not limited to the structures described in the embodiment. For example, the structure that prevents the relative rotation between the first coupling member and the second coupling member is not limited to the structure in which the engagement protrusions are engaged with each other in the circumferential direction, and friction engagement or serration engagement may be adopted, or a structure in which teeth portions of a first coupling member and a second coupling member each having a shape such as a crown gear are engaged with each other may be adopted. Further, the motor gear unit for the disc brake apparatus of the present invention is not limited to the floating type disc brake apparatus, and may be applied to an opposing piston type disc brake apparatus. Further, the disc brake apparatus of the present invention may also include three or more cylinders, three or more pistons, and three or more rotary-to-linear motion conversion mechanisms.

What is claimed is:

1. A motor gear unit for a disc brake apparatus, the motor gear unit comprising:
   an electric motor;
   a speed reduction mechanism configured to transmit rotation of the electric motor to a plurality of rotary-to-linear motion conversion mechanisms arranged in a plurality of cylinders provided in a caliper; and
   a housing accommodating the electric motor and the speed reduction mechanism,
   wherein the speed reduction mechanism includes a plurality of final gears connected directly or via another member to the plurality of rotary-to-linear motion conversion mechanisms and a power distribution mechanism that includes one support shaft and that is configured to distribute and transmit input power to the plurality of final gears, wherein the power distribution mechanism is supported by the housing by supporting and fixing end portions of the support shaft on axially both sides to the housing, wherein the power distribution mechanism further includes a gear train that includes a plurality of gears and that is unitized, wherein the gear train includes a first output member and a second output member, the first output member and the second output member are gears, wherein the first output member and the second output member each includes insertion holes through which the support shaft can be inserted, and are rotatably supported by the support shaft in a state of being separated from each other in an axial direction of the support shaft, and wherein the power distribution mechanism further includes a biasing member configured to bias the first output member and the second output member in opposite directions in an axial direction of the support shaft between the first output member and the second output member in the axial direction of the support shaft.

2. The motor gear unit for the disc brake apparatus according to claim 1, wherein the gear train further includes an input carrier, a first intermediate gear, and a second intermediate gear, the input carrier is a gear, wherein the input carrier is rotatably supported around the support shaft via the first output member and the second output member, wherein the first intermediate gear and the second intermediate gear are rotatably supported by the input carrier, and mesh with each other, wherein the first output member meshes with the first intermediate gear and one final gear between the plurality of final gears, and wherein the second output member meshes with the second intermediate gear and the other final gear between the plurality of final gears.

3. The motor gear unit for the disc brake apparatus according to claim 1, wherein the power distribution mechanism further includes a coupling configured to support the biasing member from both sides in the axial direction of the support shaft, wherein the coupling includes a first coupling member that is supported so as to be relatively rotatable around a center axis of the support shaft with respect to the first output member and that is in contact with an end portion of the biasing member on one side in the axial direction of the support shaft, and a second coupling member that is supported so as to be relatively rotatable around the center axis of the support shaft with respect to the second output member, and that is in contact with an end portion of the biasing member on the other side in the axial direction of the support shaft, and wherein the first coupling member and the second coupling member are engaged with each other so as not to be relatively rotatable around the center axis of the support shaft, and so as to be relatively displaceable in the axial direction of the support shaft.

4. The motor gear unit for the disc brake apparatus according to claim 3, wherein the first coupling member includes a first engagement protrusion that protrudes in the axial direction of the support shaft, wherein the second coupling member includes a second engagement protrusion that protrudes in the axial direction of the support shaft, and wherein the first coupling member and the second coupling member are not relatively rotatable around the center axis of the support shaft by engaging the first engagement protrusion and the second engagement protrusion with each other.

5. The motor gear unit for the disc brake apparatus according to claim 4, wherein the first coupling member includes a first base portion supported so as to be relatively rotatable around the center axis of the support shaft with respect to the first output member, wherein the second coupling member includes a second base portion supported so as to be relatively rotatable around the center axis of the support shaft with respect to the second output member, and wherein gaps in the axial direction of the support shaft are respectively provided between a tip end surface of the first engagement protrusion and the second base portion, and between a tip end surface of the second engagement protrusion and the first base portion.

6. The motor gear unit for the disc brake apparatus according to claim 3, wherein the first coupling member and the second coupling member are components having the same shape and the same size.

7. The motor gear unit for the disc brake apparatus according to claim 1, wherein rotation center axes of the support shaft and the plurality of final gears are arranged substantially parallel to center axes of the plurality of rotary-to-linear motion conversion mechanisms.

8. The motor gear unit for the disc brake apparatus according to claim 7, wherein the speed reduction mechanism further includes a drive gear connected to a motor shaft of the electric motor, and a plurality of intermediate transmission gears configured to transmit rotation of the drive gear to the power distribution mechanism, and wherein rotation center axes of the plurality of intermediate transmission gears are arranged substantially parallel to center axes of the plurality of rotary-to-linear motion conversion mechanisms.

9. The motor gear unit for the disc brake apparatus according to claim 1, wherein the housing includes a housing main body configured to accommodate the speed reduction mechanism, and a closing plate portion configured to close an opening portion of the housing main body opened in the axial direction of the support shaft, and wherein an end portion of the support shaft on one side in an axial direction is press-fitted and fixed, molded and fixed, or bonded and fixed to the housing main body.

10. The motor gear unit for the disc brake apparatus according to claim 9, wherein the closing plate portion is positioned with respect to the housing main body by using an end portion of the support shaft on the other side in the axial direction.

11. A disc brake apparatus comprising:

a caliper including a plurality of cylinders on axially inner side of a rotor;

a plurality of pistons fitted to the plurality of cylinders;
a plurality of rotary-to-linear motion conversion mechanisms that are arranged in the plurality of cylinders, and that are configured to convert a rotary motion into a linear motion to push out the plurality of pistons toward the rotor; and
a motor gear unit that is supported by and fixed to the caliper, and that is configured to drive the plurality of rotary-to-linear motion conversion mechanisms,
wherein the motor gear unit is the motor gear unit for the disc brake apparatus according to claim 1.

12. A disc brake apparatus comprising:
a caliper including a plurality of cylinders on axially inner side of a rotor;
a plurality of pistons fitted to the plurality of cylinders;
a plurality of rotary-to-linear motion conversion mechanisms that are arranged in the plurality of cylinders, and that are configured to convert a rotary motion into a linear motion to push out the plurality of pistons toward the rotor; and
a motor gear unit that is supported by and fixed to the caliper, and that is configured to drive the plurality of rotary-to-linear motion conversion mechanisms,
wherein the motor gear unit is the motor gear unit for the disc brake apparatus according to claim 3.

13. A disc brake apparatus comprising:
a caliper including a plurality of cylinders on axially inner side of a rotor;
a plurality of pistons fitted to the plurality of cylinders;
a plurality of rotary-to-linear motion conversion mechanisms that are arranged in the plurality of cylinders, and that are configured to convert a rotary motion into a linear motion to push out the plurality of pistons toward the rotor; and
a motor gear unit that is supported by and fixed to the caliper, and that is configured to drive the plurality of rotary-to-linear motion conversion mechanisms,
wherein the motor gear unit is the motor gear unit for the disc brake apparatus according to claim 8.

\* \* \* \* \*